(12) United States Patent
Kusaki et al.

(10) Patent No.: US 12,190,443 B2
(45) Date of Patent: Jan. 7, 2025

(54) ORTHOIMAGE CREATION METHOD, GROUND MODEL CREATION METHOD, ORTHOIMAGE CREATION SYSTEM, AND GROUND MODEL CREATION SYSTEM

(71) Applicant: MR Support Inc., Kyoto (JP)

(72) Inventors: Shigeo Kusaki, Kyoto (JP); Takamitsu Mori, Kyoto (JP)

(73) Assignee: MR Support Inc., Kyoto (JP)

( * ) Notice: Subject to any disclaimer, the term of this patent is extended or adjusted under 35 U.S.C. 154(b) by 199 days.

(21) Appl. No.: 17/909,823

(22) PCT Filed: Jul. 16, 2021

(86) PCT No.: PCT/JP2021/026822
§ 371 (c)(1),
(2) Date: Sep. 7, 2022

(87) PCT Pub. No.: WO2022/019236
PCT Pub. Date: Jan. 27, 2022

(65) Prior Publication Data
US 2023/0107120 A1    Apr. 6, 2023

(30) Foreign Application Priority Data
Jul. 22, 2020   (JP) .................................. 2020-125835

(51) Int. Cl.
*G06T 17/00*      (2006.01)
*B64C 39/02*      (2023.01)
(Continued)

(52) U.S. Cl.
CPC ............ *G06T 17/00* (2013.01); *B64C 39/024* (2013.01); *G06T 7/73* (2017.01); *B64U 2101/30* (2023.01);
(Continued)

(58) Field of Classification Search
None
See application file for complete search history.

(56) References Cited

U.S. PATENT DOCUMENTS

| 2014/0297059 A1 | 10/2014 | Mizutani et al. |
| 2021/0191102 A1* | 6/2021 | Choi .................. G02B 17/0652 |
| 2022/0164941 A1* | 5/2022 | Frei ....................... G06F 18/211 |

FOREIGN PATENT DOCUMENTS

| JP | 2014-194625 A | 10/2014 |
| JP | 2018-123510 A | 8/2018 |
| JP | 2021-22846 A | 2/2021 |

OTHER PUBLICATIONS

Morita et al., "Construction of marine debris quantification method using drone", IEICE Technical Report, 2019, vol. 119, No. 202, pp. 51-54, w/English machine translation (12 pages).
(Continued)

*Primary Examiner* — Frank S Chen
(74) *Attorney, Agent, or Firm* — WHDA, LLP

(57) ABSTRACT

When a road is repaired, it is easy to conduct a survey on a road condition of the road at the time of start of repair. An orthoimage creation method of the present invention includes: a coordinate acquisition step of acquiring three-dimensional coordinates for a plurality of feature points; a photographing step of photographing, by a camera 3, a plurality of photographed images such that each of the plurality of feature points is included in at least two of the photographed images; and an orthoimage creation step of creating an orthoimage with a ground pixel size of 5 mm or less on the basis of the three-dimensional coordinates of each of the feature points acquired in the coordinate acquisition step, and the plurality of photographed images photographed in the photographing step.

18 Claims, 34 Drawing Sheets

(51) Int. Cl.
*B64U 101/30* (2023.01)
*G06T 7/73* (2017.01)
(52) U.S. Cl.
CPC ............... *G06T 2207/10028* (2013.01); *G06T 2207/10032* (2013.01)

(56) References Cited

OTHER PUBLICATIONS

International Search Report dated Sep. 28, 2021, issued in counterpart International Application No. PCT/JP2021/026822 (2 pages).
Office Action dated Nov. 14, 2023, issued in counterpart JP Application No. 2020-125835, with English translation. (6 pages).

* cited by examiner

ORTHOIMAGE CREATION METHOD, GROUND MODEL CREATION METHOD, ORTHOIMAGE CREATION SYSTEM, AND GROUND MODEL CREATION SYSTEM

TECHNICAL FIELD

The present invention relates to an orthoimage creation method and an orthoimage creation system for creating an orthoimage on the basis of photographed images photographed from the sky by, for example, an unmanned aerial vehicle, and a ground model creation method and a ground model creation system for creating a ground model by using the orthoimage.

BACKGROUND ART

Conventionally, in a case where damage such as cracks occurs on a surface of asphalt pavement that constitutes a surface layer of a road, it is necessary to repair the road.

In order to repair a road, various surveys such as surveys of a road condition, the locations of plane elements including edges of a road and compartment lines such as lane marking lines at the time of start of repair are conducted. For example, a cracked spot and a crack amount in a road are surveyed. Conventionally, the survey of the cracking condition is performed by a visual observation of inspectors. A road is inspected by each inspector, and inspection work for cracks is very complicated. Therefore, in place of the inspection of cracks by inspectors, a road condition is sometimes surveyed by using a special road surface condition survey vehicle (see Patent Document 1).

PRIOR ART DOCUMENT

Patent Document

Patent Document 1: Japanese Patent Laid-Open No. 2018-123510

SUMMARY OF THE INVENTION

Technical Problem

In a case where a special road surface condition survey vehicle surveys a road condition, it is necessary to cause the road surface condition survey vehicle to travel. However, the road surface condition survey vehicle cannot travel on a road with a narrow width, and therefore the road condition cannot be surveyed.

A survey for locations of plane element including edges of a road and compartment lines such as lane marking lines in a repair region to be repaired is conducted on the location of plane elements. Conventionally, a very large number of plane positions on edges of a road and lane marker lines are measured, and respective plane elements including road edges and compartment lines such as lane marking are illustrated on the basis of the plane positions. Therefore, a very large number of plane positions need to be measured in order to illustrate plane elements, which is very complicated.

In a case where there is a manhole in a repair region, a manhole adjustment height is surveyed. As a survey for a manhole adjustment height, an adjustment height (difference between the elevation at the time of start of repair and the elevation of a repair plan surface) at each position in the longitudinal and transverse directions of a manhole is surveyed.

Conventionally, the elevation at each plane position is detected on the basis of a road longitudinal cross section and a road transverse cross section passing through each plane position in a manhole peripheral part, and an adjustment height is derived from an elevation difference between the detected elevation and the elevation of a repair plan surface. Therefore, the elevation at each plane position needs to be detected for each manhole on the basis of the road longitudinal cross section and the road transverse cross section, which is very complicated.

The present invention has been made in view of such problems, and an object thereof is to provide an orthoimage creation method, a ground model creation method, an orthoimage creation system, and a ground model creation system enabling easy survey for a road condition at the time of start of repair when a road is repaired.

Solution to Problem

In order to solve such problems, the present invention provides the following solutions.

That is, an orthoimage creation method according to the present invention includes: a coordinate acquisition step of acquiring three-dimensional coordinates for a plurality of feature points; a photographing step of photographing, by a photographing device, a plurality of photographed images such that each of the plurality of feature points is included in at least two of the photographed images; and an orthoimage creation step of creating an orthoimage with ground pixel size of 5 mm or less on the basis of the three-dimensional coordinates of each of the feature points acquired in the coordinate acquisition step, and the plurality of photographed images photographed in the photographing step.

An orthoimage creation system according to the present invention includes: a coordinate storage means for storing three-dimensional coordinates for a plurality of feature points; a photographed image storage means for storing, by a photographing device, a plurality of photographed images photographed so as to include each of the plurality of feature points in at least two of the photographed images; and an orthoimage creation means for creating an orthoimage with ground pixel size of 5 mm or less on the basis of the three-dimensional coordinates of each of the feature points stored in the coordinate storage means, and the plurality of photographed images stored in the photographed image storage means.

Consequently, the orthoimage creation method and the orthoimage creation system according to the present invention, the orthoimage with ground pixel size of 5 mm or less is created, so that it is possible to create an orthoimage in which the condition of the road surface and the position of plane elements around the road can be clearly distinguished. In the orthoimage created by the present invention, it is possible to clearly distinguish spots where cracks and patching have occurred in a road. Therefore, it is not necessary to drive a special road surface condition survey vehicle to survey the cracking condition of a road surface, and therefore it is possible to survey the road condition regardless of the road width.

In the orthoimage created by the present invention, it is possible to clearly distinguish the locations of plane element including the edges of the road and compartment lines such as lane marking lines. Therefore, there is no need to measure on a large number of plane positions in order to illustrate the plane elements including the edges of the road and compartment lines such as lane marking lines, and therefore it is possible to easily illustrate the plane elements on the basis of the orthoimage.

In the orthoimage created by the present invention, it is possible to distinguish each plane position in the longitudinal direction and the transverse direction of a manhole peripheral part. Therefore, after identifying each plane position in the longitudinal and transverse directions of the manhole peripheral part, the elevation of each plane position can be retrieved from the point group data acquired by a three-dimensional scanning device. Therefore, it is not necessary to create a road longitudinal cross section and a road transverse cross section for each manhole in order to detect the elevation of each plane position in the longitudinal and transverse directions of the manhole peripheral part. Accordingly, it is possible to easily detect the manhole adjustment height.

In the orthoimage creation method according to the present invention, the photographing device is a photographing device located at an altitude of 20 meters or less above a ground.

In the orthoimage creation system according to the present invention, the photographing device is a photographing device located at an altitude of 20 meters or less above a ground.

Consequently, in the orthoimage creation method and the orthoimage creation system according to the present invention, it is possible to easily create an orthoimage with ground pixel size of 5 mm or less.

In the orthoimage creation method according to the present invention, the photographing device is an unmanned aerial vehicle or a model aerial vehicle that flies at an altitude of 20 meters or less above the ground.

In the orthoimage creation system according to the present invention, the photographing device is an unmanned aerial vehicle or a model aerial vehicle that flies at an altitude of 20 meters or less above the ground.

Consequently, in the orthoimage creation method and the orthoimage creation system according to the present invention, it is possible to easily create an orthoimage with ground pixel size of 5 mm or less in a relatively wide range.

In the orthoimage creation method according to the present invention, the feature points are survey markers installed on the ground at a time of photographing in the photographing step, and in the coordinate acquisition step, three-dimensional coordinates of the survey markers are acquired by any of a total station, a positioning system using a satellite, and a three-dimensional scanning device.

In the orthoimage creation system according to the present invention, the feature points are survey markers installed on the ground at a time of photographing by the photographing device, and the coordinate storage means stores three-dimensional coordinates of the survey markers acquired by any of a total station, a positioning system using a satellite, and a three-dimensional scanning device.

Consequently, in the orthoimage creation method and the orthoimage creation system according to the present invention, it is possible to easily create an orthoimage in which the condition of the road surface and the position of plane elements around the road can be clearly distinguished.

A ground model creation method according to the present invention includes: a point group data acquisition step of acquiring point group data generated as three-dimensional coordinates for each point in a predetermined region included in an orthoimage created by any of the orthoimage creation methods described above by a laser beam emitted from a three-dimensional scanning device installed in a known point; and a ground model creation step of creating a ground model in the predetermined region on the basis of the orthoimage and the point group data acquired in the point group data acquisition step.

A ground model creation system according to the present invention includes: a point group data storage means for storing point group data generated as three-dimensional coordinates for each point in a predetermined region included in an orthoimage created by any of the orthoimage creation systems described above by a laser beam emitted from a three-dimensional scanning device installed in a known point; and a ground model creation means for creating a ground model in the predetermined region on the basis of the orthoimage and the point group data stored in the point group data storage means.

Consequently, in the ground model creation method and the ground model creation system according to the present invention, it is possible to clearly detect the three-dimensional shape of the predetermined region included in the orthoimage. Therefore, for example, it is possible to clearly detect height information such as the height of road surface irregularities, steps around a road, and the manhole height.

Advantageous Effect of the Invention

Thus, according to the present invention, it possible to create an orthoimage in which the condition of a road surface and the position of plan elements around the road can be clearly distinguished. In addition, it is possible to clearly detect the three-dimensional shape of a predetermined region included in the orthoimage.

DESCRIPTION OF THE EMBODIMENT

Figure 1:
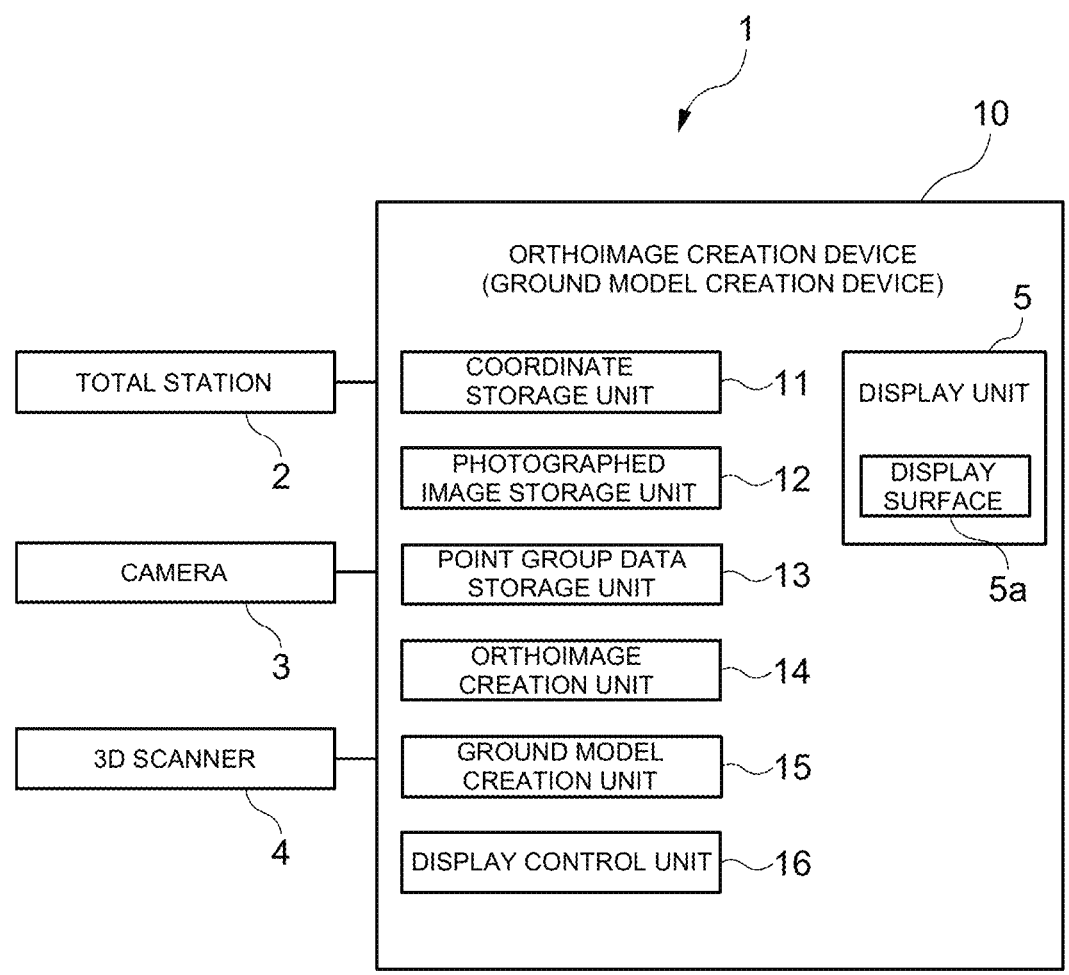
FIG. 1 is a diagram illustrating a schematic configuration of an orthoimage creation system according to an embodiment of the present invention.

Hereinafter, an embodiment of the present invention will be described with reference to the drawings.

An orthoimage creation system 1 (ground model creation system) according to an embodiment of the present invention has a total station 2 installed at a known point (e.g., a reference point), a camera 3 as a photographing device, a 3D scanner 4 (three-dimensional scanning device) installed at a known point, and an orthoimage creation device 10 (ground model creation device) wirelessly connected to the total station 2, the camera 3 and the 3D scanner 4.

The total station 2 emits ranging light toward each point on a surface of a road, receives reflected light reflected at each point, acquires three-dimensional coordinates of each point relative to the known point on the basis of the number of times of oscillation of a light wave from the light emission to the light reception, and supplies the three-dimensional coordinates to the orthoimage creation system 10. In this embodiment, the total station 2 is used to acquire the three-dimensional coordinates of a plurality of survey markers 6.

The camera 3 (photographing device) is operated by, for example, a road inspector to photograph the road surface and acquire photographed data, and supplies the photographed data to the orthoimage creation device 10.

The 3D scanner 4 acquires each point on the road surface as point group data generated as three-dimensional coordinates (collection of elevations with plane position coordinates) by irradiation with a laser beam, and supplies the point group data to the orthoimage creation system 10. The 3D scanner 4 emits a line laser beam to an object to be measured (road surface) in, for example, the vertical and horizontal directions and measures the time that the laser pulse travels back and forth between a measurement point on the object to be measured and a sensor, so that it is possible to obtain a distance to the measurement point. In this embodiment, the 3D scanner 4 is used to acquire three-dimensional coordinates (point group data) at the time of start of repair, at each point in the region that includes a repair spot where the road is to be repaired. The point group data acquired by the 3D scanner 4 is, for example, data at intervals of 25 cm or less. In this embodiment, the 3D scanner 4 acquires point group data at intervals of, for example, 5 mm.

As illustrated in FIG. 1, the orthoimage creation device 10 is composed of, for example, a microcomputer, and includes a CPU, a ROM storing a program that controls the operation of the orthoimage creation device 10, and a RAM that temporarily stores data used in executing the above program.

The orthoimage creation device 10 has a coordinate storage unit 11, a photographed image storage unit 12, a point group data storage unit 13, an orthoimage creation unit 14, a ground model creation unit 15, and a display control unit 16. Furthermore, the orthoimage creation device 10 has a display unit 5 such as a display screen.

The coordinate storage unit 11 separately stores the three-dimensional coordinates of feature points of the plurality of survey markers 6 and the like acquired by the total station 2.

The photographed image storage unit 12 stores a plurality of images of the road photographed by the camera 3, which is held and operated by an inspector in the vicinity of the road. The camera 3 is disposed at an altitude of, for example, 20 meters or less above the ground when photographing, for example, at an altitude of 1 to 5 meters above the ground, preferably at an altitude of 1 to 3 meters above the ground.

Figure 2:
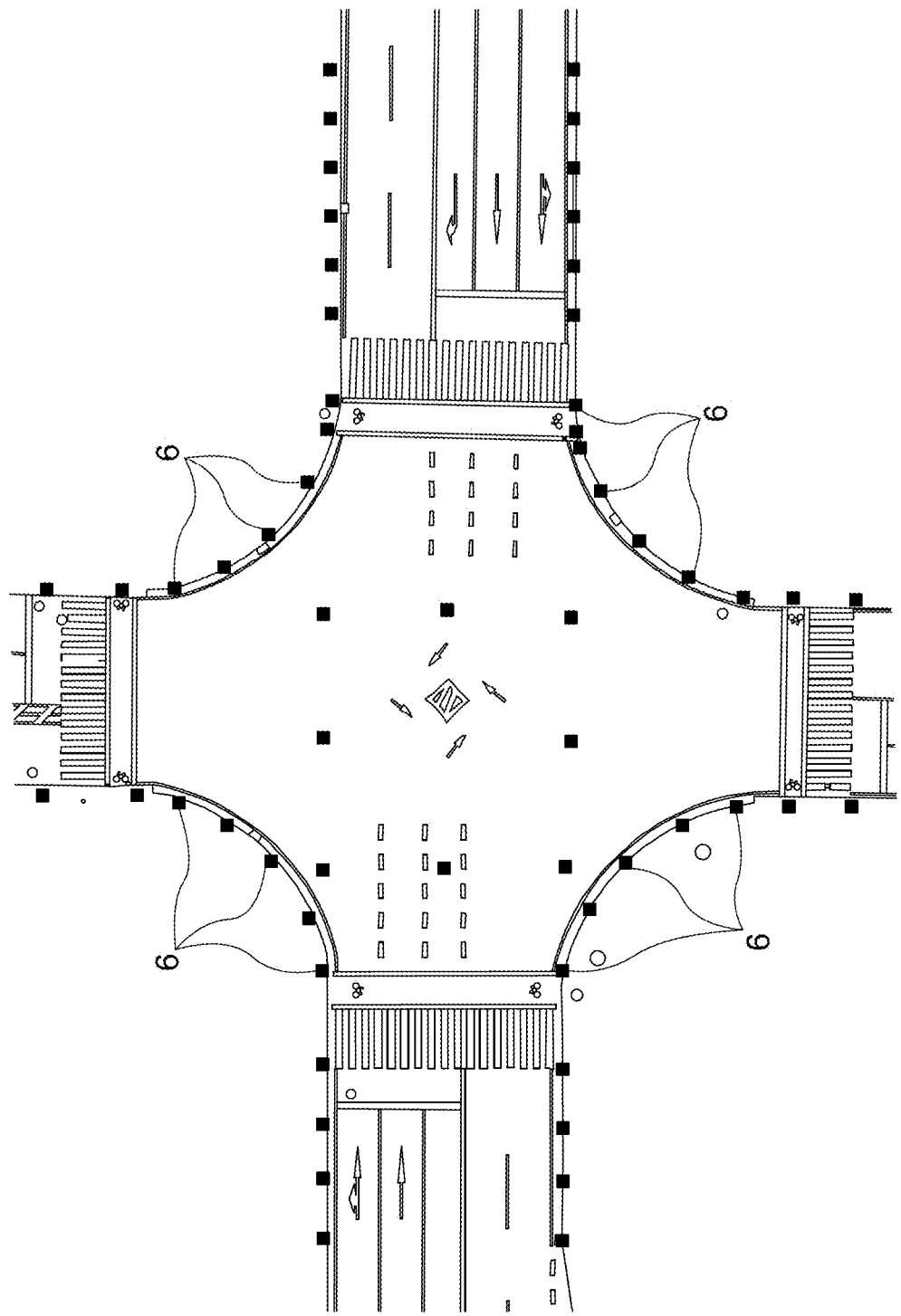
FIG. 2 is a diagram illustrating a state in which a plurality of survey markers are installed near both edge of a road when the road is photographed from the sky.

In a case where a road is photographed by the camera 3, the plurality of survey markers 6 are installed as a plurality of feature points, for example, in the vicinity of both edges of the road, as illustrated in FIG. 2. The plurality of survey markers 6 are installed along the edge of the road (in the longitudinal direction of the road), for example, at intervals of 1 to 20 meters, preferably at intervals of 1 to 10 meters, preferably at intervals of 1 to 5 meters. The plurality of survey markers 6 are installed with the consideration that a plurality of images photographed by the camera 3 are connected to create an orthoimage. Each survey marker 6 is a feature point, three-dimensional coordinates of which are to be supplied, and is used as a rating point. In a case where a plurality of photographed image are connected to create an orthoimage, feature points, which are included in the plurality of photographed images, and three-dimensional coordinates of which are not supplied may be used in addition to the survey markers 6.

Figure 3:
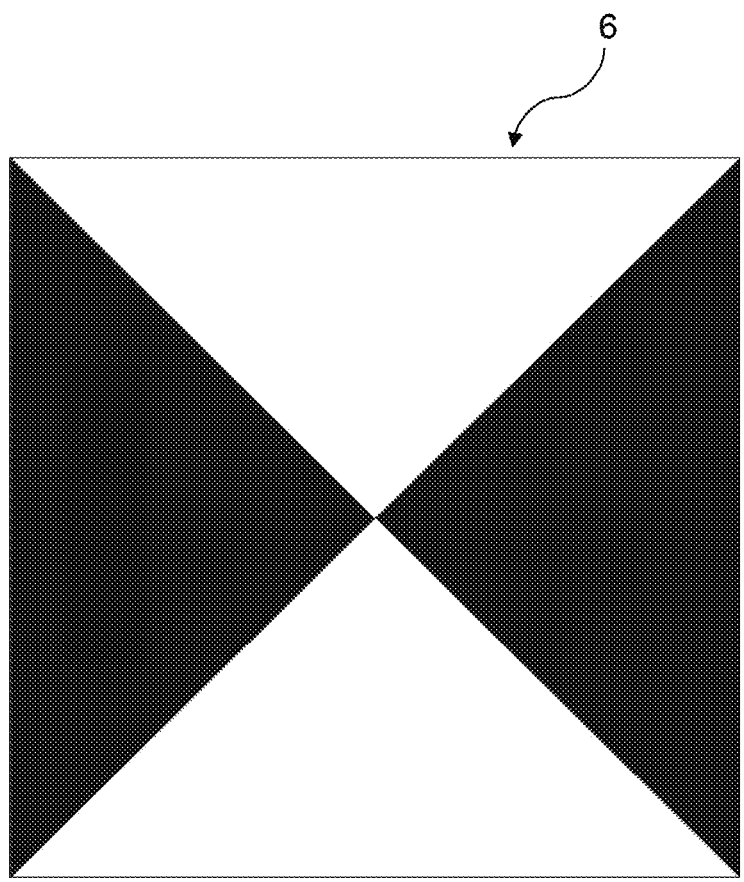
FIG. 3 is a diagram illustrating the survey marker.

Each survey marker 6 is a square plate-like member as illustrated in FIG. 3. The survey marker 6 is marked with a pattern that makes a center position clear. The survey marker 6 has a back surface formed with an adhesive layer, and is a seal-like marker attached with a backing paper so as to cover the adhesive layer, and can be easily fixed at an installation spot by removing the backing paper and attaching the survey marker to the road. Accordingly, when the survey marker 6 is used, the backing paper covering the adhesive layer is removed and the back surface of the survey marker 6 is used by being attached to the road surface. The survey marker 6 of this embodiment is, for example, a square shape of 9 cm×9 cm, but the type, the shape, the size, the pattern, and the like of the survey marker 6 are not limited thereto.

Figure 4:
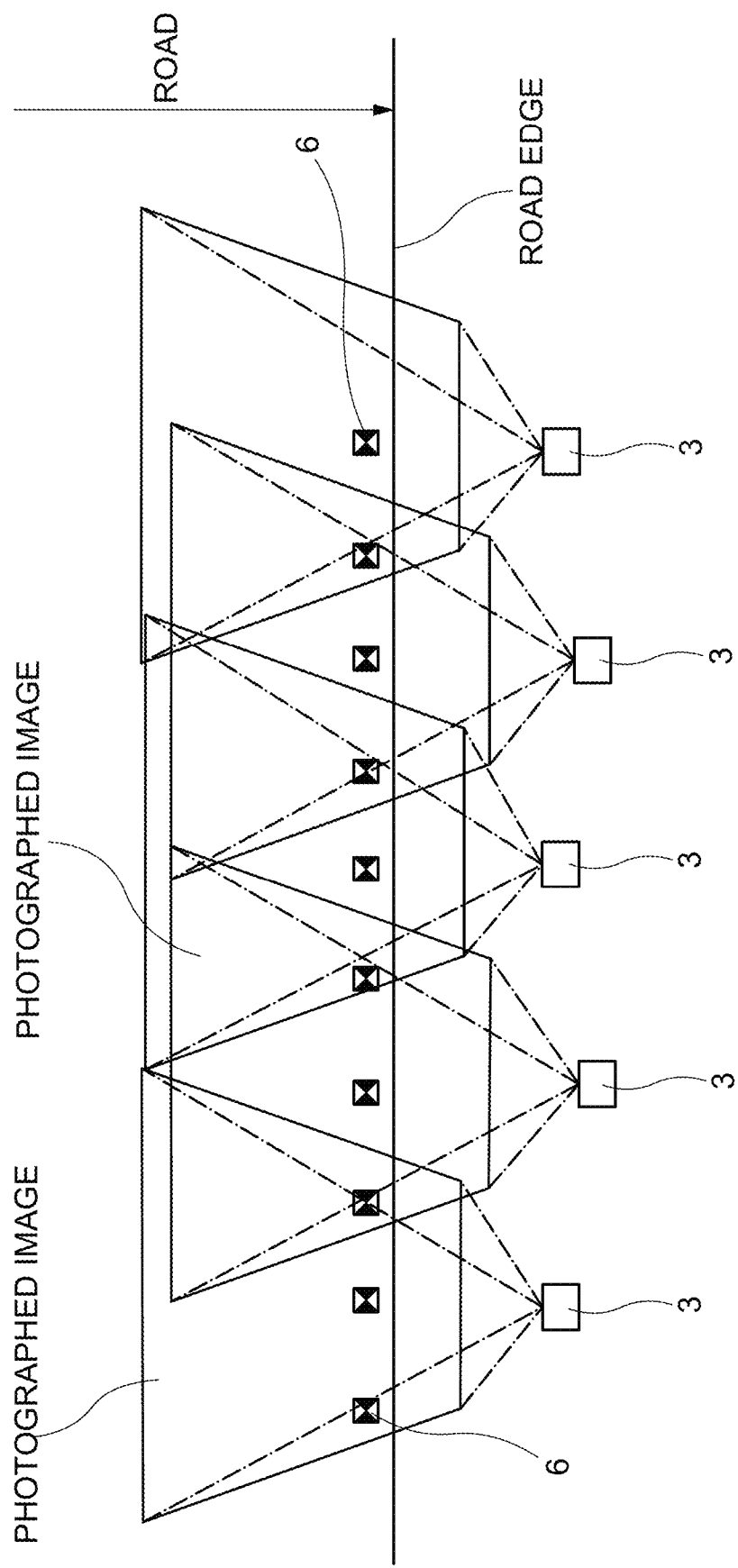
FIG. 4 is a diagram illustrating a state in which the survey marker is included in each two of photographed images.

In this embodiment, an inspector who photographs the road photographs from a roughly constant height, from outside a road edge toward the center of the road, as illustrated in FIG. 4. At that time, the inspector photographs while moving along the road edge to photograph the road surface without gaps. The plurality of images to be photographed by the camera 3 are photographed such that at least the one common survey marker 6 is photographed in two of the adjacent photographed images. FIG. 4 illustrates a case where the survey markers 6 are included in all photographed images, but the plurality of images photographed by the camera 3 may be photographed such that any of the survey marker 6 and the feature points other than the survey marker 6 is included in at least the two of the photographed images.

The point group data storage unit 13 separately stores the point group data generated as the three-dimensional coordinates for each point in a predetermined region acquired by the 3D scanner 4. The predetermined region is at least a portion of the region included in the orthoimage created in the orthoimage creation unit 14. In this embodiment, the predetermined region is the entire region included in the orthoimage created in the orthoimage creation unit 14.

The orthoimage creation unit 14 creates an orthoimage on the basis of the three-dimensional coordinates of the survey markers 6 stored in the coordinate storage unit 11 and a plurality of the photographed images stored in the photographed image storage unit 12. Specifically, the orthoimage creation unit 14 performs SfM (Structure from Motion) analysis or the like on the data for the plurality of photographed images, so that two of the adjacent photographed images are connected on the basis of the common survey marker 6 photographed by above units to create the orthoimage. The ground pixel size of the orthoimage produced by the orthoimage creation unit 14 is 5 mm or less. In a case where a vehicle is on a road in a photographed image for creating an orthoimage, it is possible to automatically recognize the vehicle (by automatic image recognition) and replace a region around the vehicle on the road with an image of the road without the vehicle in another photographed image for creating an orthoimage with no vehicle on the road.

The ground model creation unit 15 creates a ground model of a predetermined region included in the orthoimage on the basis of the orthoimage created by the orthoimage creation unit 14 and point group data stored in the point group data storage unit 13. Specifically, the ground model creation unit 15 creates a ground model by supplementing the point group data stored in the point group data storage unit 13 with the color information of the orthoimage created by the orthoimage creation unit 14. That is, the ground model is color-supplemented point group data. The predetermined region is at least a portion of the region included in the orthoimage created in the orthoimage creation unit 14. The ground model creation unit 15 of this embodiment creates a ground model of the entire region of the orthoimage.

The display control unit 16 displays, on the display unit 5, the orthoimage created by the orthoimage creation unit 14. A user can perform operation for designating a predetermined position in the image displayed on the display unit 5 by pressing a display surface 5a of the display unit 5. For example, in a state in which the orthoimage created by the orthoimage creation unit 14 is displayed on the display unit 5, the user can perform the operation for designating a predetermined position by pressing the predetermined position in the orthoimage displayed on the display surface 5a of the display unit 5.

(Creation of Orthoimage and Creation of Ground Model)

Figure 5:
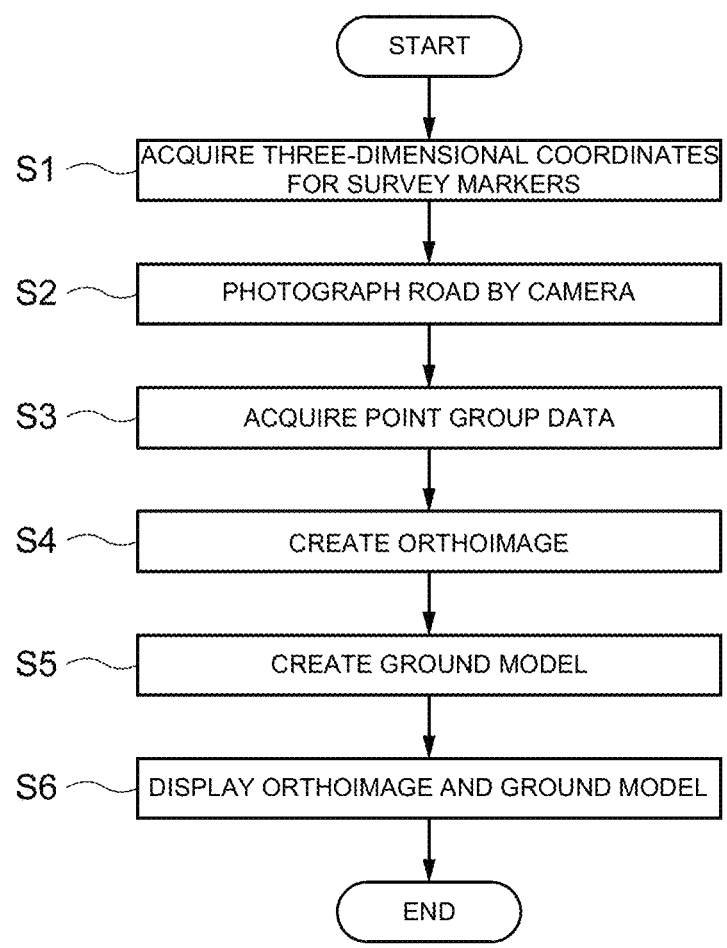
FIG. 5 is a diagram illustrating a creation method for creating an orthoimage in an orthoimage creation device.

A creation method for creating creation of an orthoimage and a ground model in the orthoimage creation device 10 will be described with reference to FIG. 5.

In Step S1 (coordinate acquisition step), the total station 2 acquires three-dimensional coordinates, that is, plane positions (latitudes and longitudes) and elevations (heights) for a plurality of predetermined positions, that is, predetermined positions where the plurality of survey markers 6 are installed, in the periphery of a repair spot where road repair is performed.

In Step S2 (photographing step), the road is photographed by the camera 3. The camera 3 photographs a road in a state of being disposed at an altitude of 20 meters or less above the ground, for example, by operation, by a road inspector in the vicinity of the road. When the photographing is performed, a plurality of the survey markers 6 are previously installed at a plurality of predetermined positions where measurement is performed in Step S1. Therefore, for the plurality of survey markers 6, a plurality of photographed images are photographed such that each survey marker 6 is included in at least two of the photographed images.

In Step S3 (point group data acquisition step), the 3D scanner 4 acquires point group data generated as three-dimensional coordinates, for each point in the region where the photographed images are photographed in Step S2 to create an orthoimage.

In Step S4 (orthoimage creation step), an orthoimage is created on the basis of the three-dimensional coordinates obtained in Step S1 and the plurality of photographed images photographed in Step S2.

In Step S5 (ground model creation step), a ground model is created on the basis of the orthoimage created in Step S4 and the point group data acquired in Step S3.

In Step S6 (display step), the orthoimage created in Step S4 or the ground model created in Step S5 is displayed.

Figure 6:
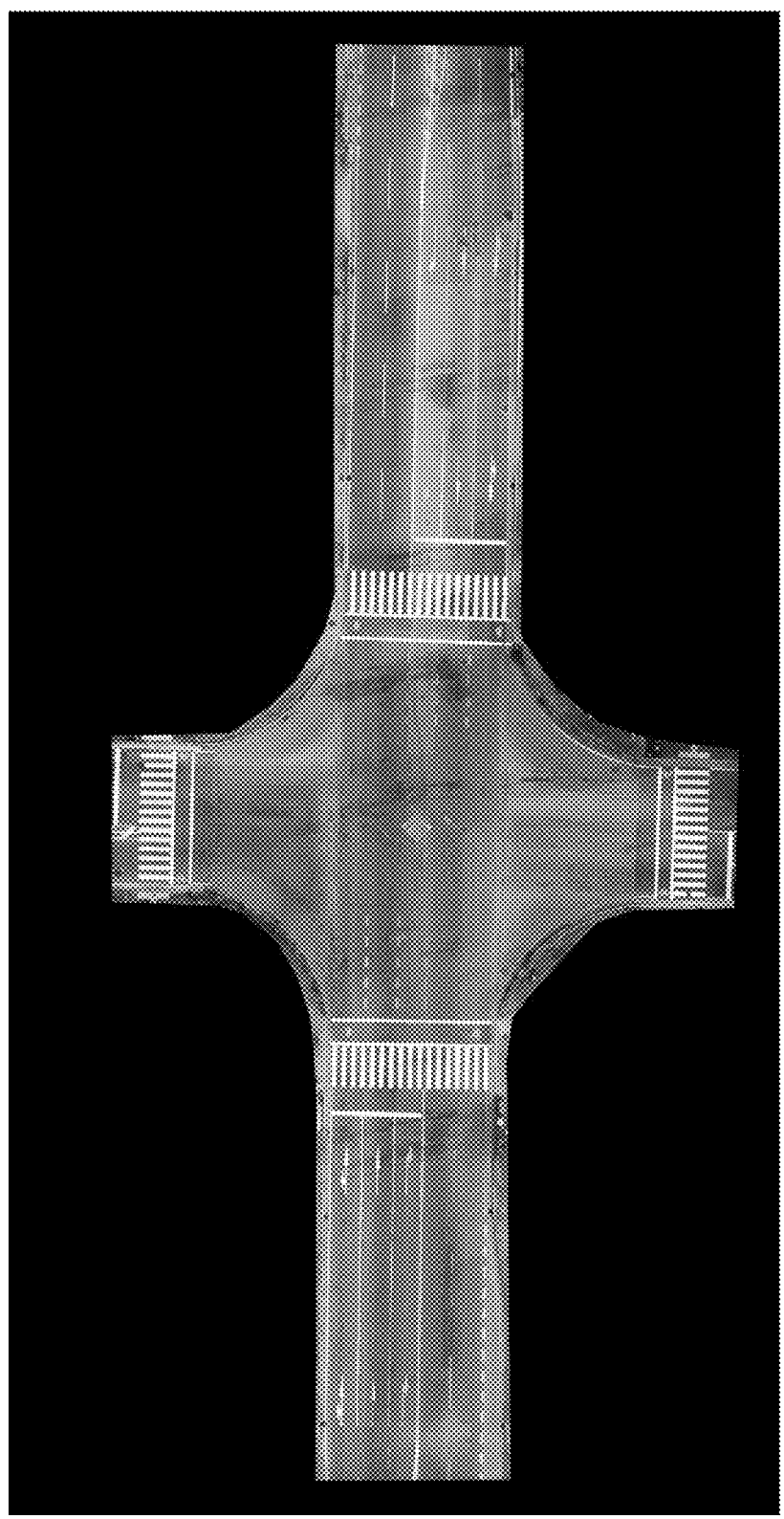
FIG. 6 is a diagram illustrating a state in which an orthoimage is displayed on a display unit.

FIG. 6 illustrates a state in which the orthoimage created in Step S4 is displayed on the display unit 5. In this embodiment, the ground pixel size of the orthoimage is 5 mm or less.

Figure 7:
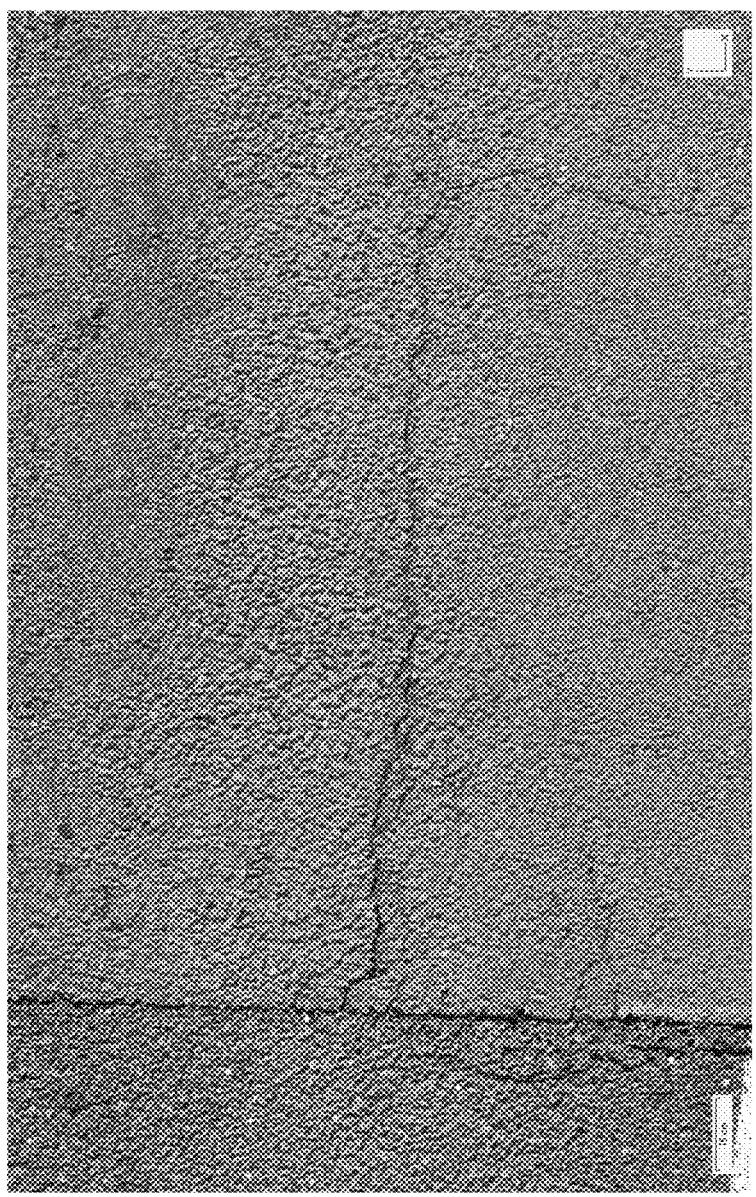
FIG. 7 is an enlarged view of a road surface formed with cracks.
Figure 8:
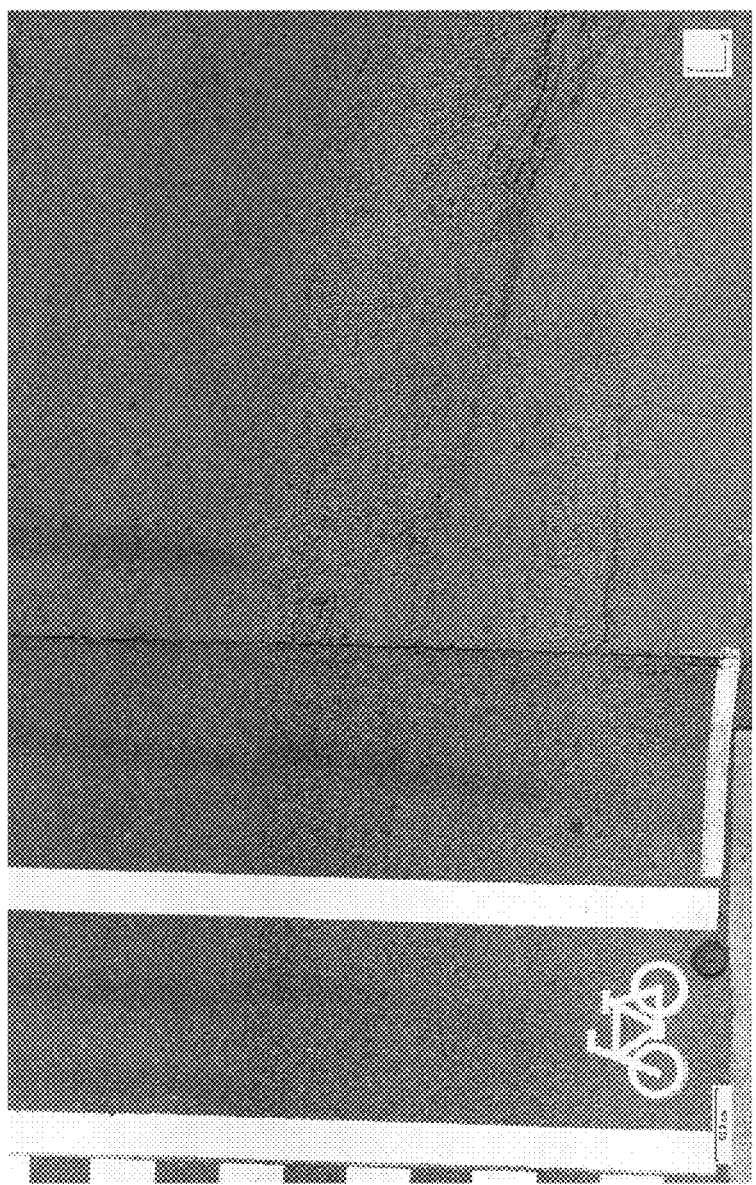
FIG. 8 is an enlarged view of a road surface formed with cracks.
Figure 9:
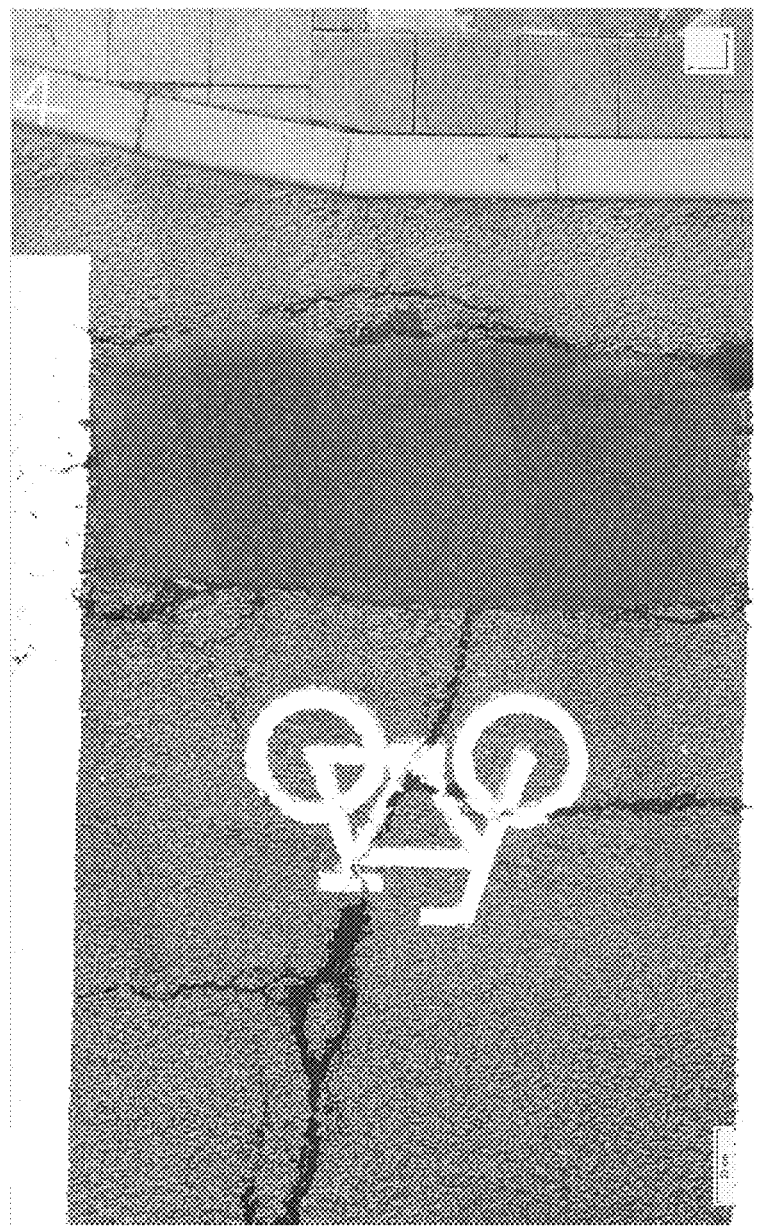
FIG. 9 is an enlarged view of a road surface formed with cracks.
Figure 10:
FIG. 10 is an enlarged view of a road surface formed with a manhole.

FIG. 7 to FIG. 9 are enlarged views of a road surface formed with cracks. FIG. 10 is an enlarged view of a road surface with a manhole. Thus, in the orthoimages created by the orthoimage creation device 10 of this embodiment, it is possible to clearly distinguish cracks formed on the road surface, and also clearly distinguish the type of a manhole on the basis of the letters and symbols on a cover of the manhole.

In a case where a conventional road condition survey for cracking condition on a road surface is performed by a road surface condition survey vehicle, it is possible to detect a crack of about 1 mm width formed on the road surface. Therefore, an evaluation was made as to whether or not a crack of about 1 mm width formed on the road surface was able to be detected by the orthoimages created by the present invention as well as a special road surface condition survey vehicle.

Figure 11:
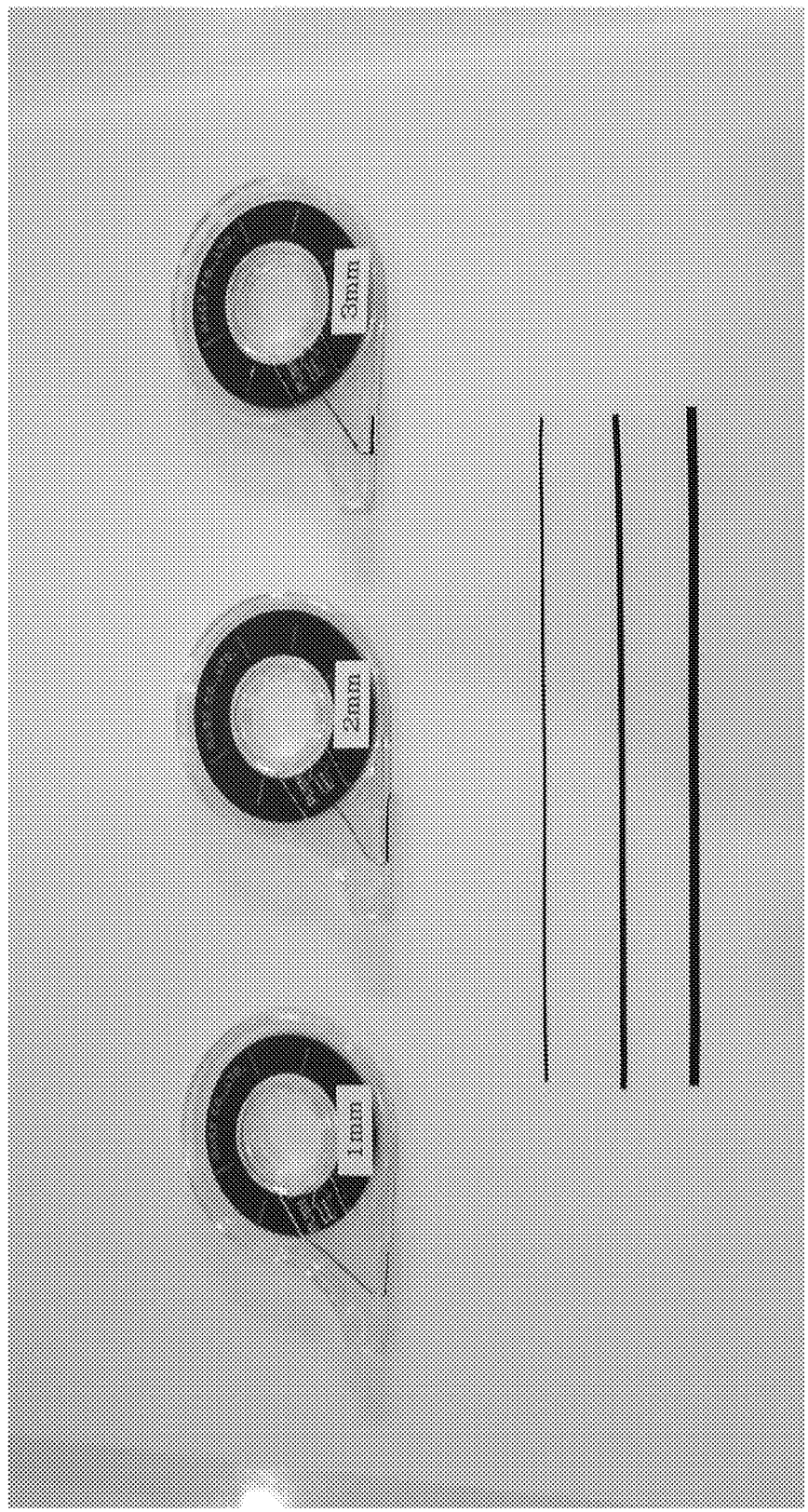
FIG. 11 is a diagram illustrating tapes used to evaluate detection of cracks formed on the road surface.
Figure 12:
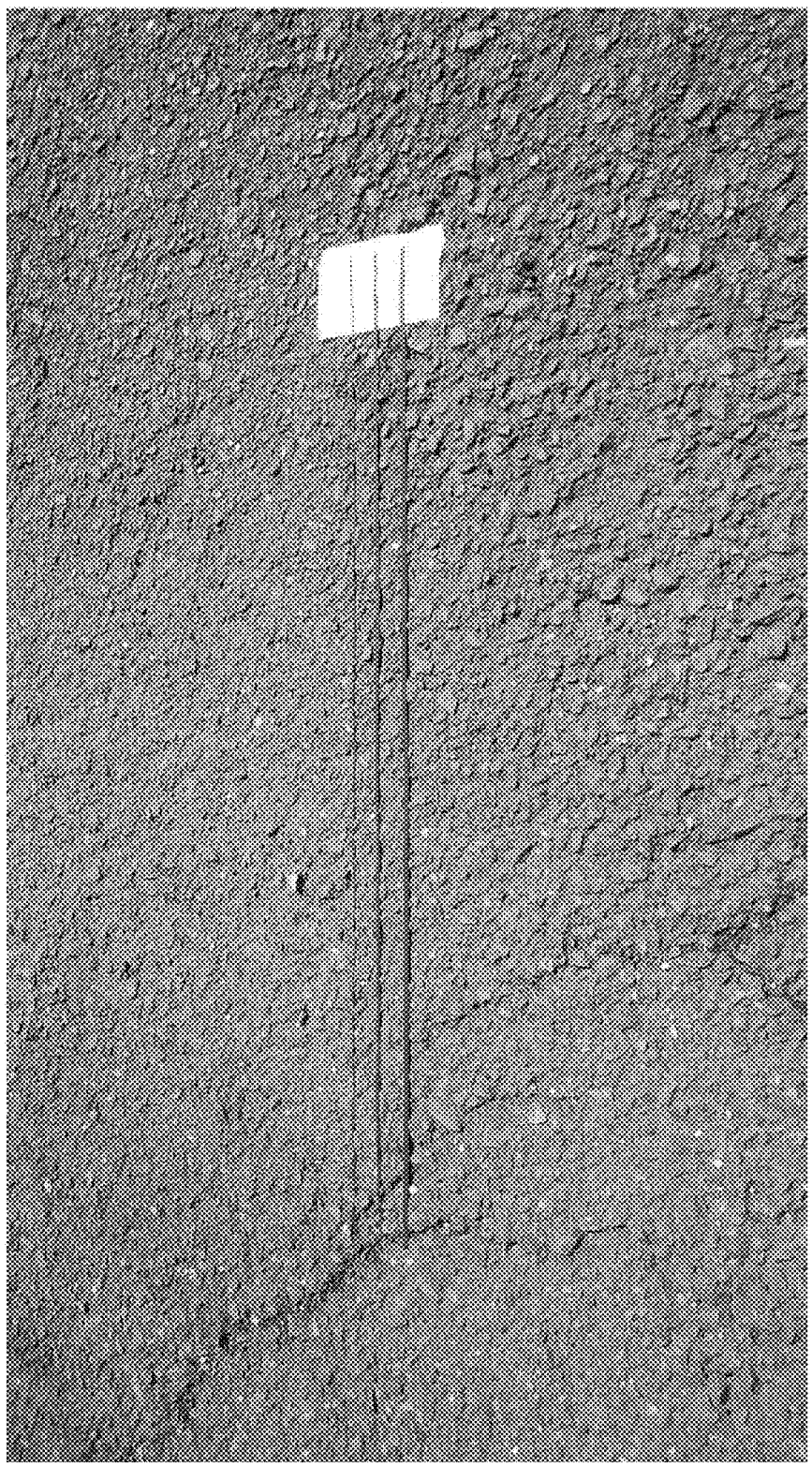
FIG. 12 is a diagram illustrating a state in which the tapes of FIG. 11 are attach onto the road surface.

As illustrated in FIG. 11 and FIG. 12, as the above evaluations, respective tapes of 1 mm width, 2 mm width, and 3 mm width were used and attached to the road surface to simulate the formation of respective cracks of 1 mm, 2 mm, and 3 mm widths. Thereafter, the road with the simulated cracks was photographed from the air by a UAV flying at an altitude of 20 meters or less above the ground, so that an orthoimage of the road was created.

Figure 13:
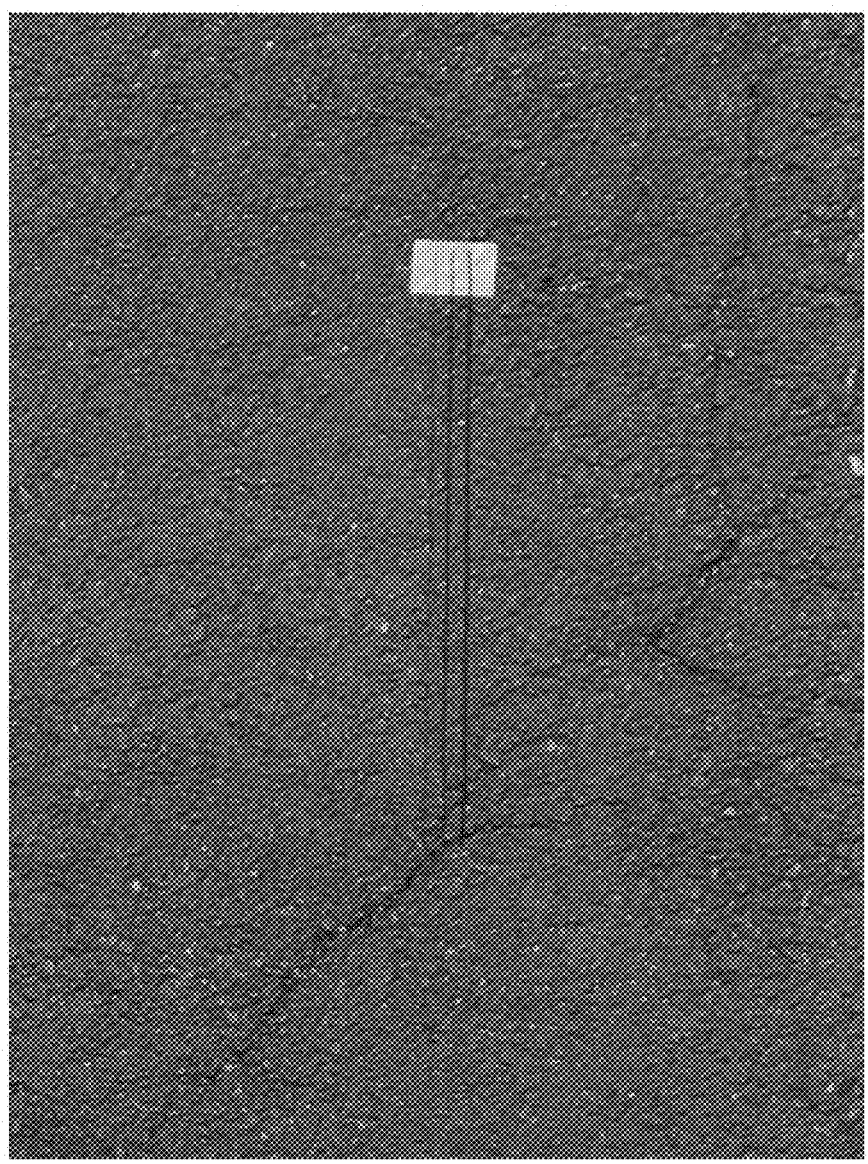
FIG. 13 is a diagram illustrating an orthoimage of the road surface of FIG. 12.

FIG. 13 illustrates an orthoimage of a road with the simulated cracks. It is found from the orthoimage created by the present invention that all the simulated cracks with 1 mm, 2 mm, and 3 mm width formed on the road surface were able to be detected. Therefore, in the orthoimage created by the present invention, it is possible to detect a crack with about 1 mm width formed on the road surface. The case of an orthoimage created by photographing the road with the camera 3 placed at an altitude of 20 meters or less above the ground is considered to be similar.

As illustrated in FIG. 6 to FIG. 13, in the orthoimage created in Step S4, for example, the position of the road edge, the position of cracks (cracks) on the road surface, the position of plane elements around the road, the position of a manhole, and the like can be clearly detected.

However, it may be impossible to clearly detect three-dimensional shapes such as road surface irregularities by the orthoimage created in Step S4.

In this embodiment, in a case where it is necessary to clearly detect the three-dimensional shape of the road surface in a predetermined region included in the orthoimage created in Step S4, a coordinate system of the orthoimage and a coordinate system of the point group data obtained in Step S3 are made to coincide and are pasted together to create a ground model of the predetermined region.

Specifically, the color information for each point in the orthoimage is supplemented for the point group data at a position corresponding to that point. In point group data obtained after the color supplement, each point has an x-coordinate, a y-coordinate, and a z-coordinate as well as color information, enabling clear detection of a three-dimensional shape as road surface irregularities which are difficult to detect clearly in an orthoimage.

Thus, in this embodiment, in a case where it is necessary to clearly detect a plane position, for example, the position of a crack formed on the surface of a road, the position of road surface irregularities, or the position of a manhole, the orthoimage can be enlarged to clearly detect the plane position.

In contrast, for example, in a case where height information such as the height of road surface irregularities and the height of a manhole needs to be clearly detected, the height information can be clearly detected on the basis of the ground model.

That is, the ground model created in Step S5 has appropriate x, y and z coordinates for each point included in the orthoimage, and the sectional shape of any position in the ground model is displayed on the display unit 5 on the basis of the ground model, so that it is possible to display the three-dimensional shape of the ground included in the orthoimage (e.g., road surface irregularities, cracks in the road surface, and the like). Therefore, it is possible to clearly detect the three-dimensional shape of the ground included in the orthoimage.

(Road Survey Method Using Orthoimage)

As described above, the orthoimage created by the orthoimage creation device 10 is used for various surveys performed when a road is repaired.

In this embodiment, a road survey method used to (1) survey a cracking (crack) condition of a road surface, (2) survey a location of a plane element around a road including a spot to be repaired, (3) survey to repair a manhole peripheral part, (4) survey a distance between two designated points on a road surface, and (5) survey the area of a designated range on a road surface by using the orthoimage created by the orthoimage creation device 10 will be described.

(Road Survey Method 1)

Figure 14:
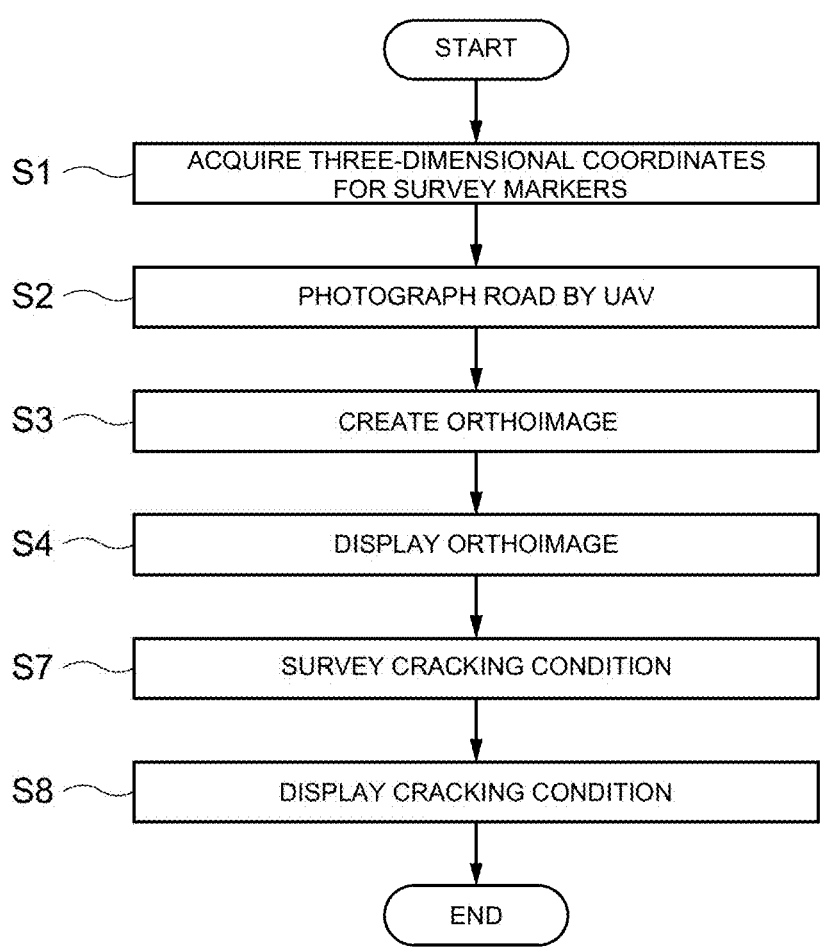
FIG. 14 is a diagram illustrating a method for surveying a state of a crack on a road surface.

The survey method for the cracking condition of a road surface will be described with reference to FIG. 14.

In the survey for the cracking condition of the road surface, a spot where the crack is formed on the road surface including a repair spot where the road repair is to be performed, and cracking and patching rates in the point.

After displaying the orthoimage according to Steps S1 to S4 described above, the cracking condition of the road surface is surveyed on the basis of the orthoimage displayed on the display unit 5, the cracking condition of the road surface is surveyed on the basis of the orthoimage displayed on the display unit 5 in Step S7. Specifically, a survey region on the road displayed on the display unit 5 is divided into a plurality of survey ranges, and the cracking and patching rates of the road surface are surveyed for each of these survey ranges.

Figure 15:
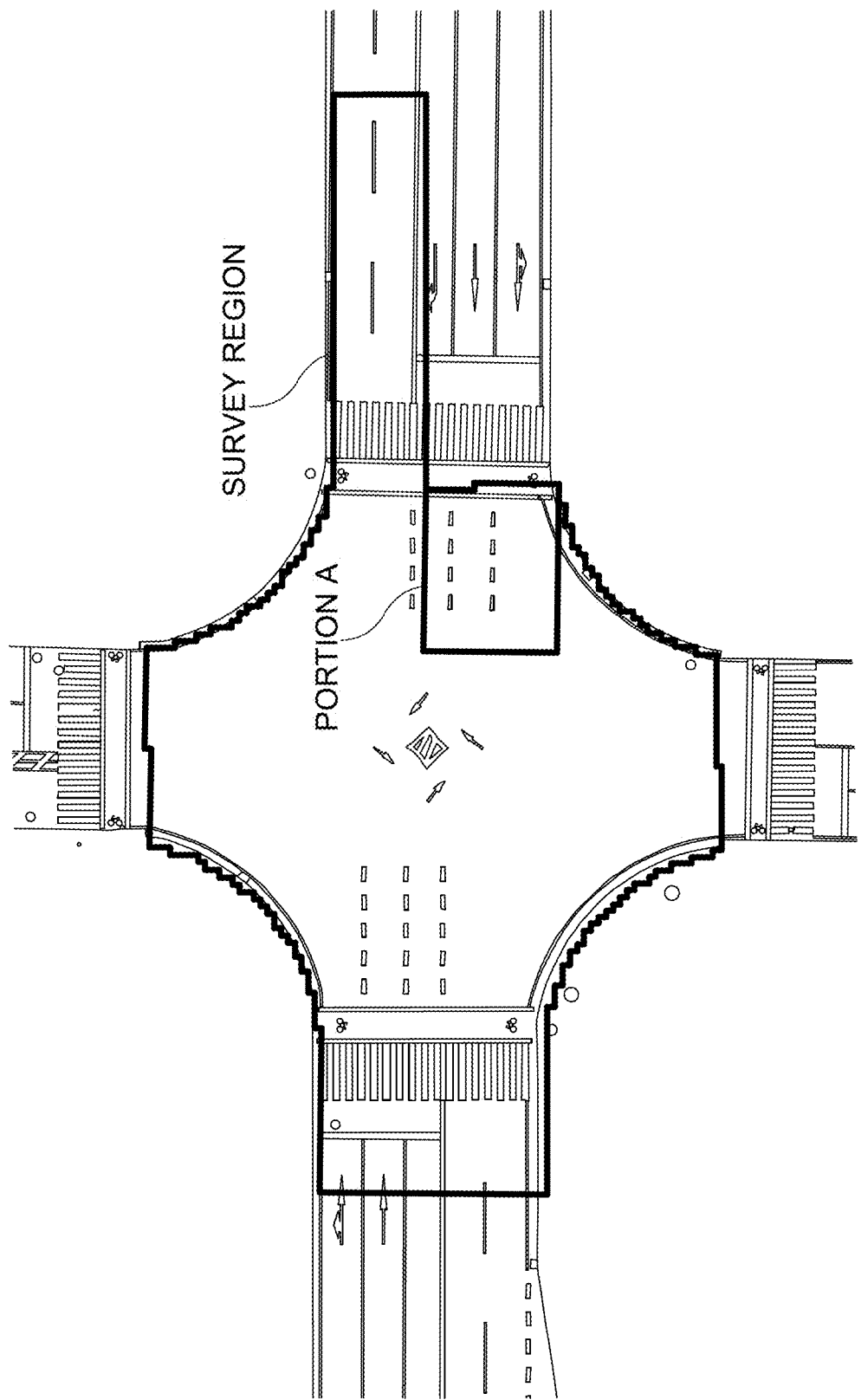
FIG. 15 is a diagram illustrating a survey region in an orthoimage displayed on the display unit.

In FIG. 15, a survey region in the orthoimage displayed on the display unit 5 is illustrated. In this embodiment, the survey region is divided into survey ranges of 50 cm×50 cm, and a cracking rate survey and a patching rate survey are conducted for each survey region, as a survey of the cracking condition. In this embodiment, as the cracking rate survey, a crack amount (quantity of cracks) for each survey range is surveyed.

Figure 16:
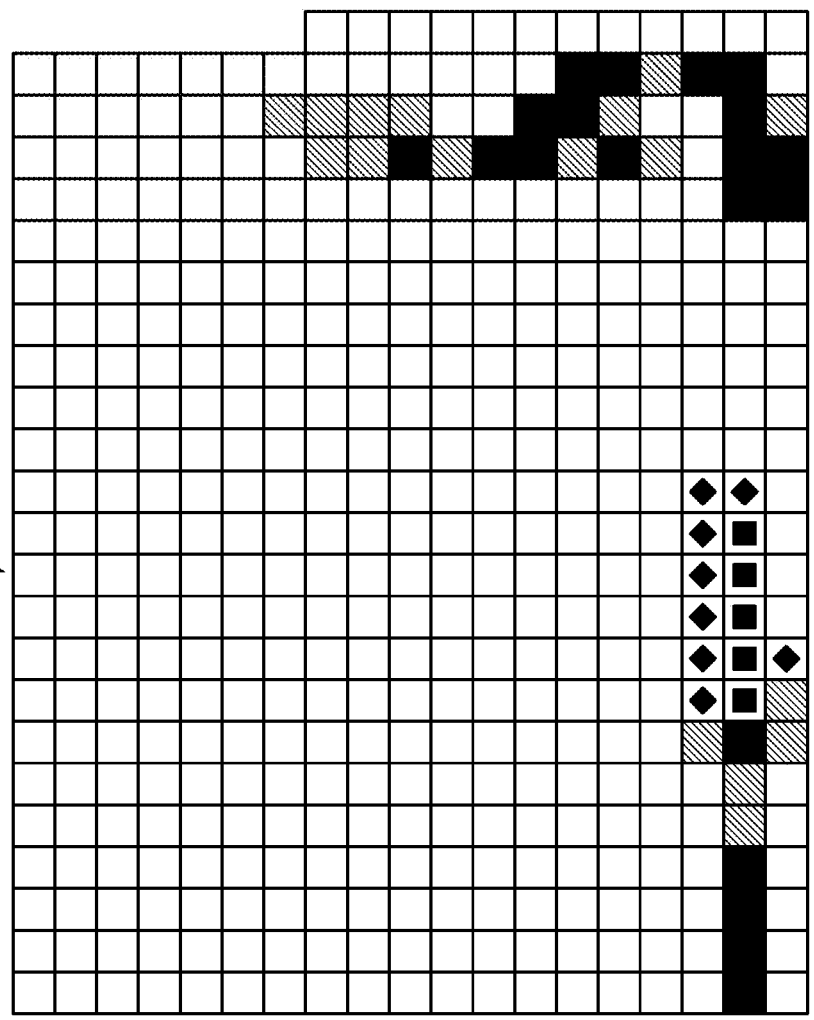
FIG. 16 is an enlarged view of a portion A within the survey region illustrated in FIG. 15.

FIG. 16 is an enlarged view of a portion A within the survey region illustrated in FIG. 15, and illustrates a state in which the portion A is divided into a plurality of survey ranges. FIG. 16 illustrates the following conditions: no cracking and a patching rate of 25% or less; a linear cracking condition (one crack); a planar cracking condition (two or more cracks); a patching rate of 25% to 75%; and a patching rate of 75% or more are distinguished for each survey range. In FIG. 16, the respective road surface conditions for survey ranges are distinguished by different patterns. However, the respective road surface conditions for survey ranges may be distinguished by different colors and displayed.

Figure 17:
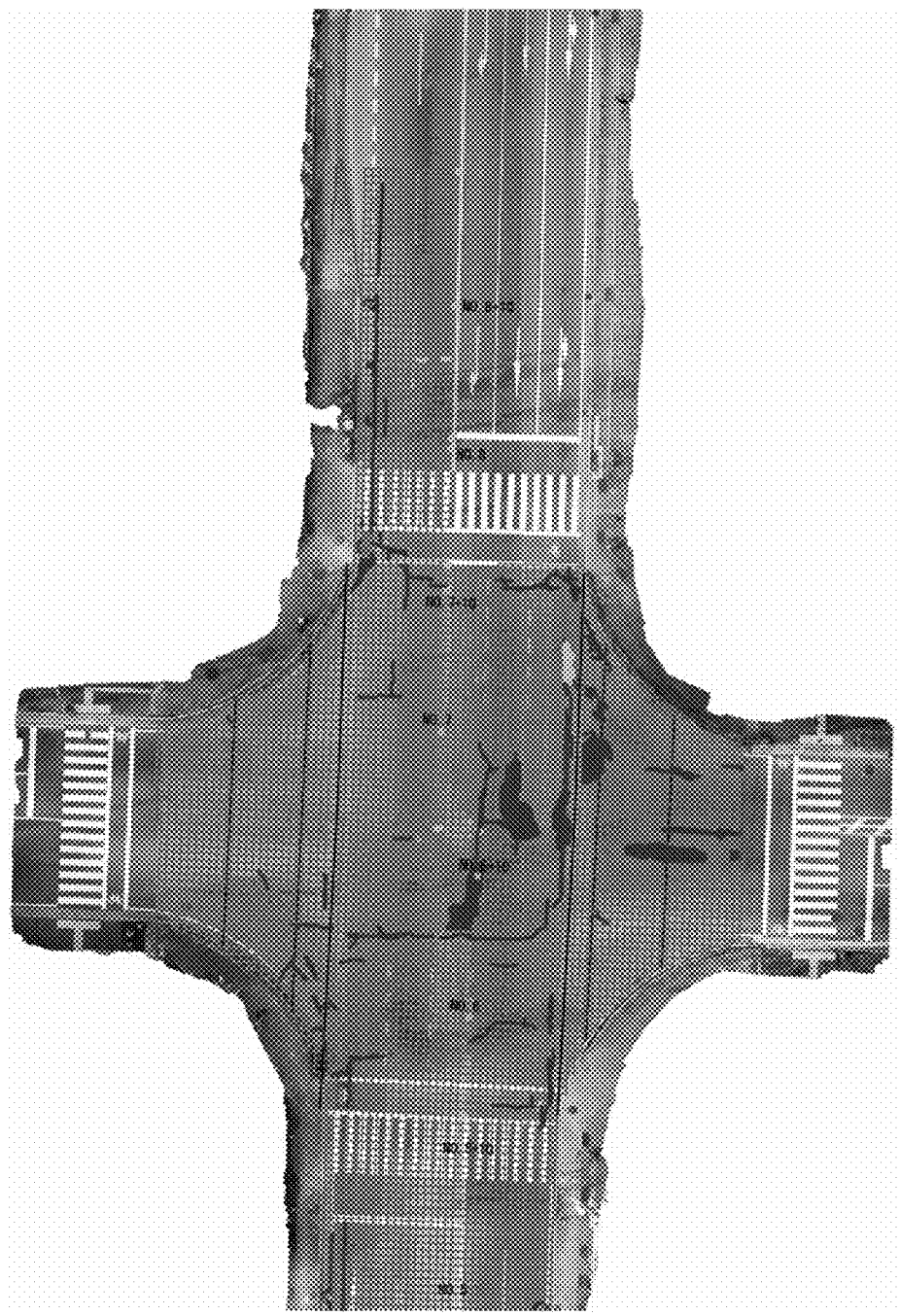
FIG. 17 is a diagram illustrating a survey result of a condition of the road surface for each survey range in an entire survey region.

As illustrated in FIG. 17, in Step S8 (road condition display step), the results of the survey of the cracking condition of the road surface for each survey range in the entire survey region are displayed on the display unit 5. In FIG. 17, respective survey ranges of the linear cracking condition, the planar cracking condition, the condition of a patching rate of 25% to 75%, and the condition of a patching rate of 75% or more may be distinguished by, for example, different colors, and displayed. In addition, the survey ranges in the linear cracking condition and the planar cracking condition, and the survey ranges of the condition of a patching rate of 25% to 75% and the condition of a patching rate of 75% or more may be distinguished, for example, by respective different colors.

(Road Survey Method 2)

Figure 18:
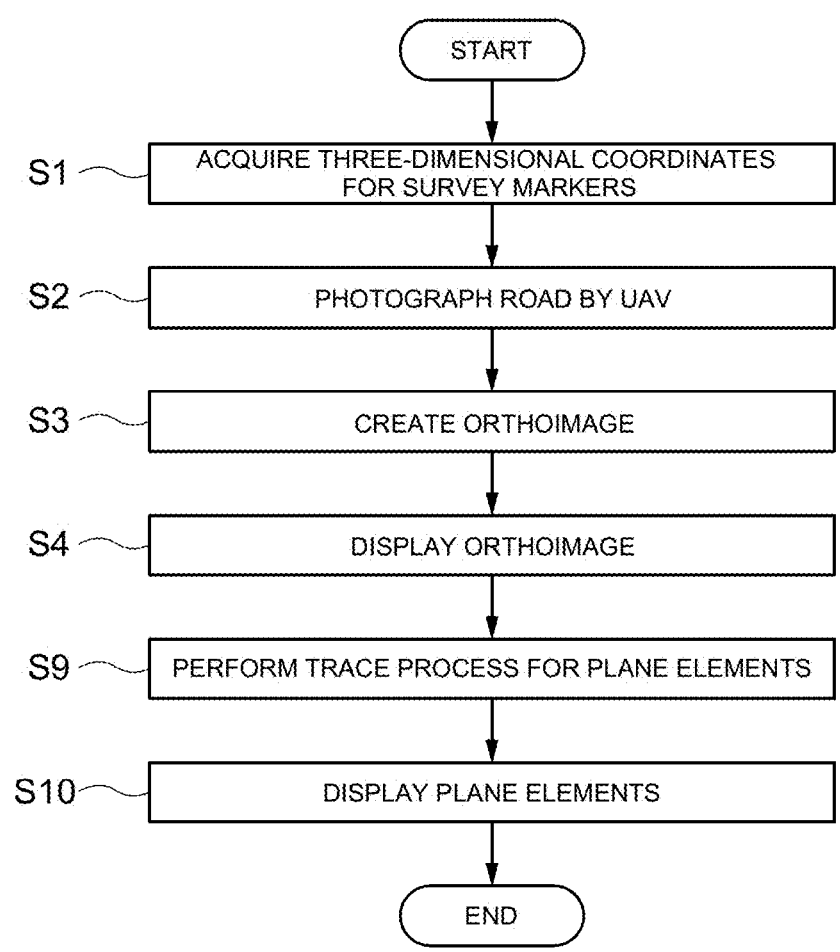
FIG. 18 is a diagram illustrating a survey method for a location of a plane element around a road.

The survey method for the location of a plane element around a road will be described with reference to FIG. 18.

In the survey for the location of the plane element around the road, the positions of the plan elements including the edge of the road including the repair spot where road repair is to be made, road deformation, compartment lines such as portions painted in white indicating lanes and other regions on the road surface, and lines indicating positions of a manholes and other objects.

After the orthoimage is created according to Step S1 to Step S4 described above, in Step S9 (plan element illustration step), a trace process for plan elements around the road is performed manually or automatically (auto-trace process) on the basis of the orthoimage displayed on display unit 5. Specifically, the trace process for the plane elements including, for example, the edges of a road, road deformations, compartment lines such as portions painted in white indicating lanes on the road surface, and lines indicating the positions of manholes and other objects is performed on the road displayed on the display unit 5.

Figure 19:
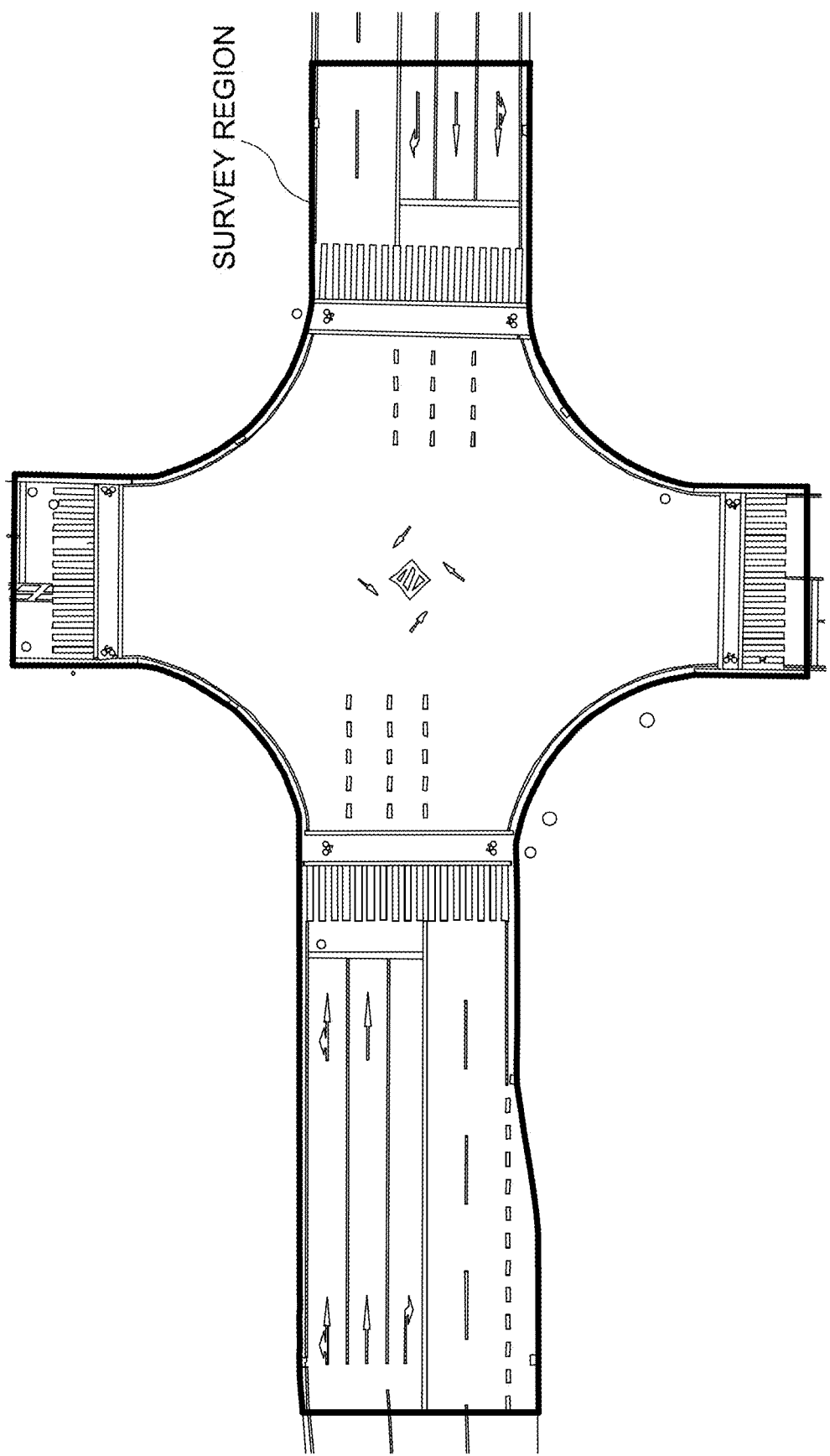
FIG. 19 is a diagram illustrating a survey region in an orthoimage displayed on the display unit.
Figure 20:
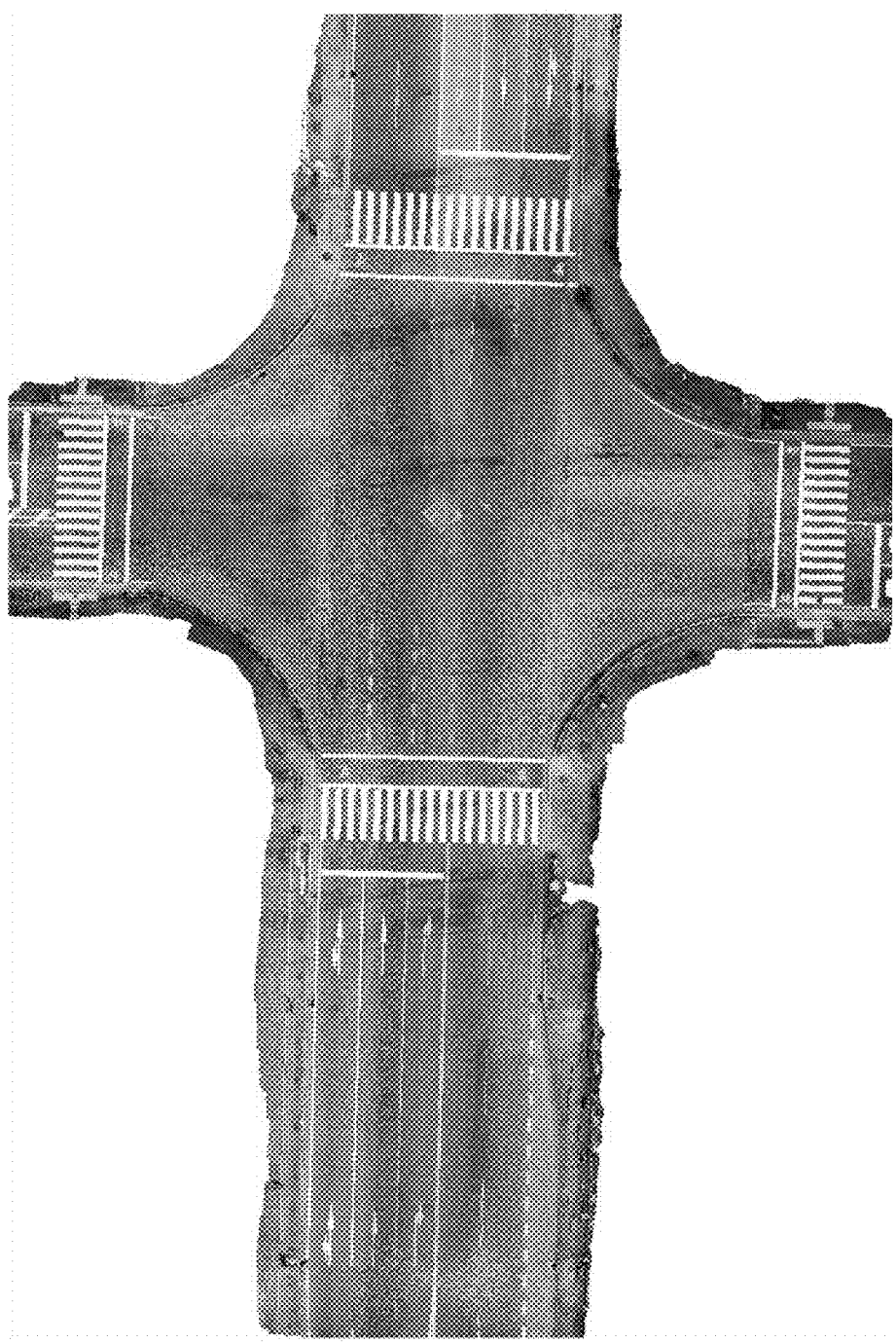
FIG. 20 is an ortho-CAD plan view of an orthoimage.
Figure 21:
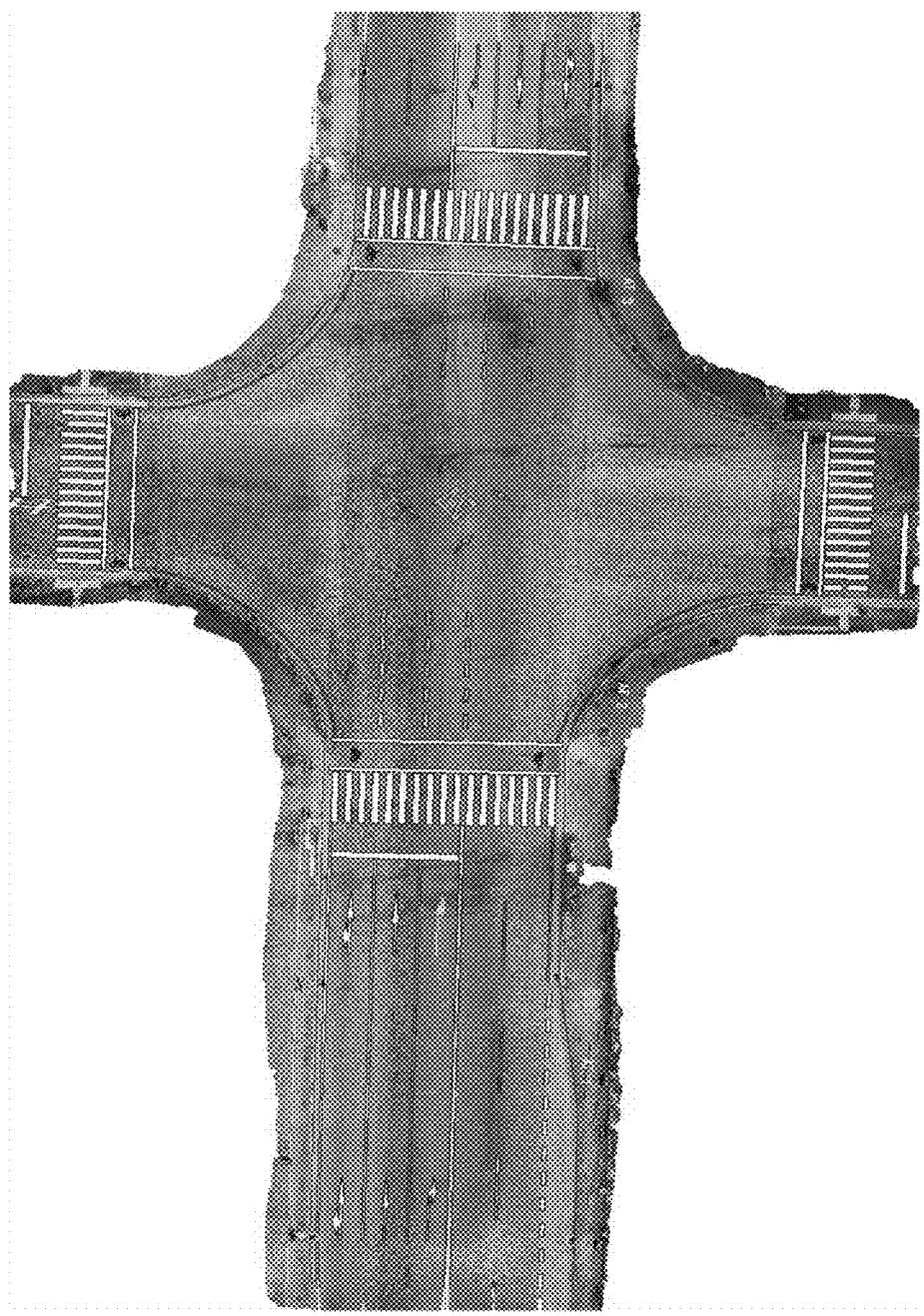
FIG. 21 is a diagram obtained by performing a trace process for plane elements around a road with respect to the ortho-CAD plan view of FIG. 20.

In FIG. 19, the survey region in the orthoimage displayed on the display unit 5 is illustrated. FIG. 20 is an ortho-CAD plan view of the orthoimage illustrated in FIG. 6, and FIG. 21 illustrates the trace process of the plan elements around the road for the ortho-CAD plan view of FIG. 20. The ortho-CAD plan view is a plan view of an orthoimage converted to 2D CAD. Therefore, in FIG. 21, lines indicating the locations of plane element around the road are added to the ortho-CAD plan view corresponding to the orthoimage in FIG. 20.

Figure 22:
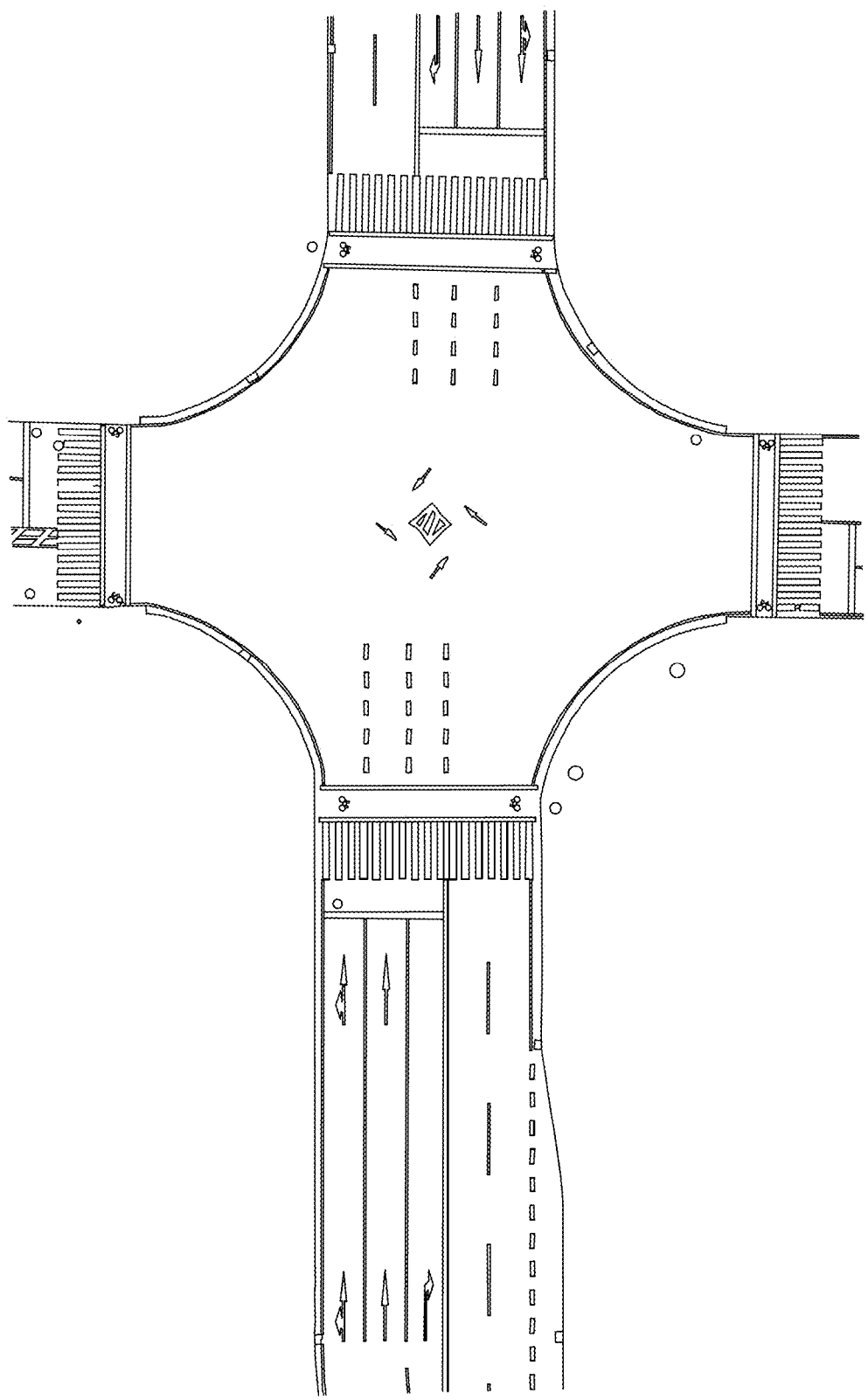
FIG. 22 is a diagram of an illustrated plane element of an entire survey range.

As illustrated in FIG. 22, the plan elements around the road are traced and illustrated in the entire survey range, and the plan elements are displayed on the display unit 5 in Step S10.

(Road Survey Method 3)

Figure 23:
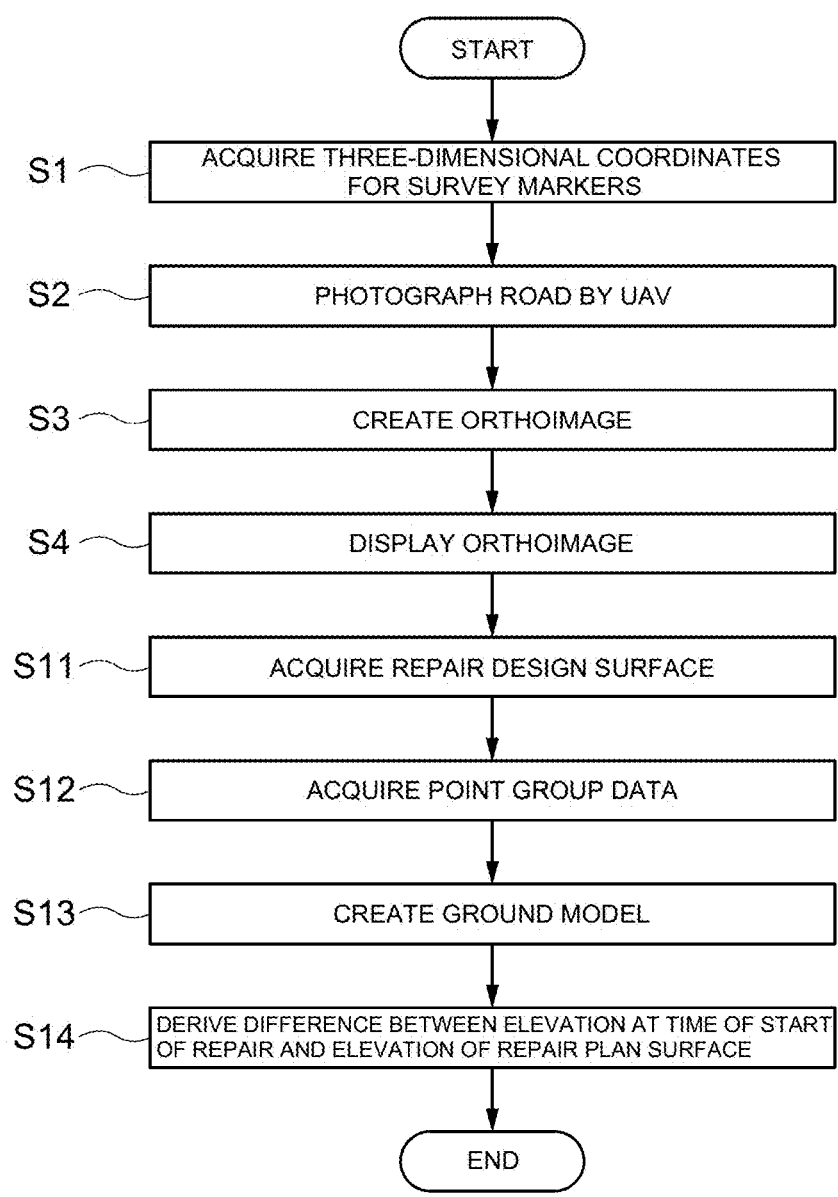
FIG. 23 is a diagram illustrating a survey method for repairing the periphery of a manhole.

The survey method for repairing a manhole peripheral part will be described with reference to FIG. 23.

In the survey for repairing a manhole peripheral part, the height at which the elevation of the manhole peripheral part is adjusted in the road repair so as to match the elevation of a repair plan surface (adjustment height) is surveyed. Therefore, the adjustment height of the manhole peripheral part is an elevation difference between the elevation of the manhole peripheral part at the time of start of repair and the elevation of the repair plan surface. As for the adjustment height of the manhole peripheral part, the elevation difference between two spots, namely, the upstream and downstream sides in the longitudinal direction of the manhole, and the elevation difference between two spots, namely the upstream and downstream sides in the transverse direction of the manhole.

Figure 24:
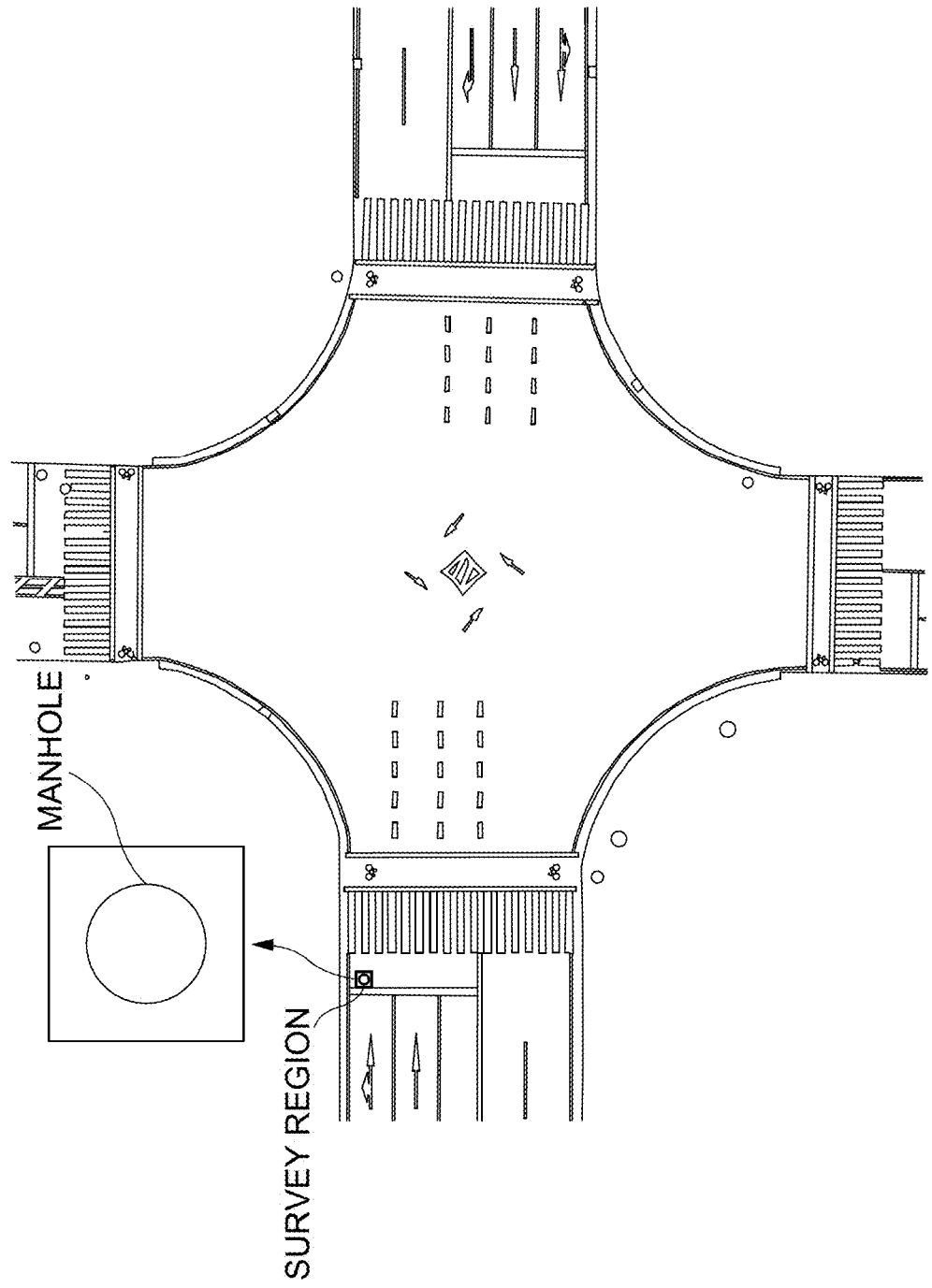
FIG. 24 is a diagram illustrating a survey region in an orthoimage displayed on the display unit.

In FIG. 24, a survey region in the orthoimage displayed on the display unit 5 is illustrated. The survey region of FIG. 24 includes one manhole, and is the manhole peripheral part.

After the orthoimage is displayed according to Step S1 to Step S4 described above, longitudinal and transverse plans are performed in Step S11, so that plan surface data indicating the repair plan surface when the road is repaired is acquired.

The repair plan includes longitudinal and transverse plans, and after the longitudinal plan along the longitudinal direction of the road is conducted, the transverse plan along the transverse direction at a plurality of spots of the road is conducted, so that a repair plan surface used to repair is acquired. Therefore, the repair plan surface includes plan surface data indicating a longitudinal plan surface and plan surface data indicating a plurality of transverse plan surfaces.

Figure 25:
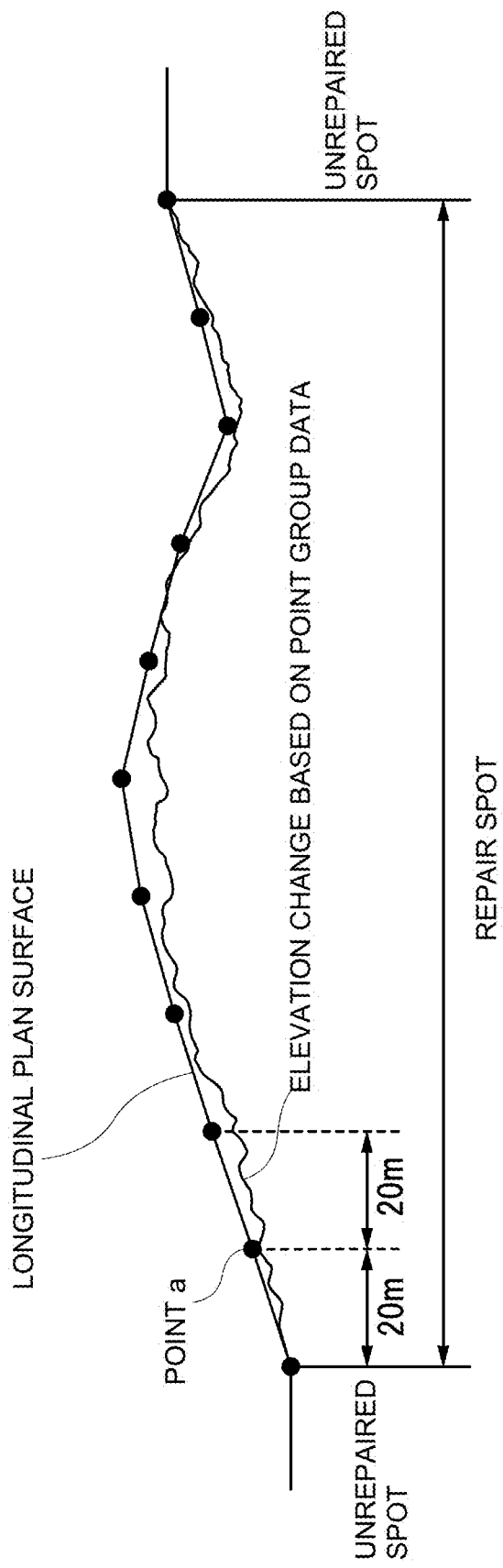
FIG. 25 is a schematic diagram illustrating a longitudinal plan surface.

The longitudinal plan includes a plan for the elevation at each point on the line along the longitudinal direction of the road in the center of the road. For example, FIG. 25 illustrates the longitudinal plan surface for the elevation at each point on the line along the center of the road. In FIG. 25, a repair spot where the repair plan is required is between an unrepaired spot on the left and an unrepaired spot on the right. In the repair spot in FIG. 25, the elevation change based on the point group data, as well as the longitudinal plan surface are illustrated.

The longitudinal plan surface in FIG. 25 is obtained by connecting the respective elevations at positions on the line along the center of the road after the elevations are planned, taking into account the flatness of the road and other factors. The positions on the line along the center of the road are, for example, every 10 meters or every 20 meters.

Figure 26:
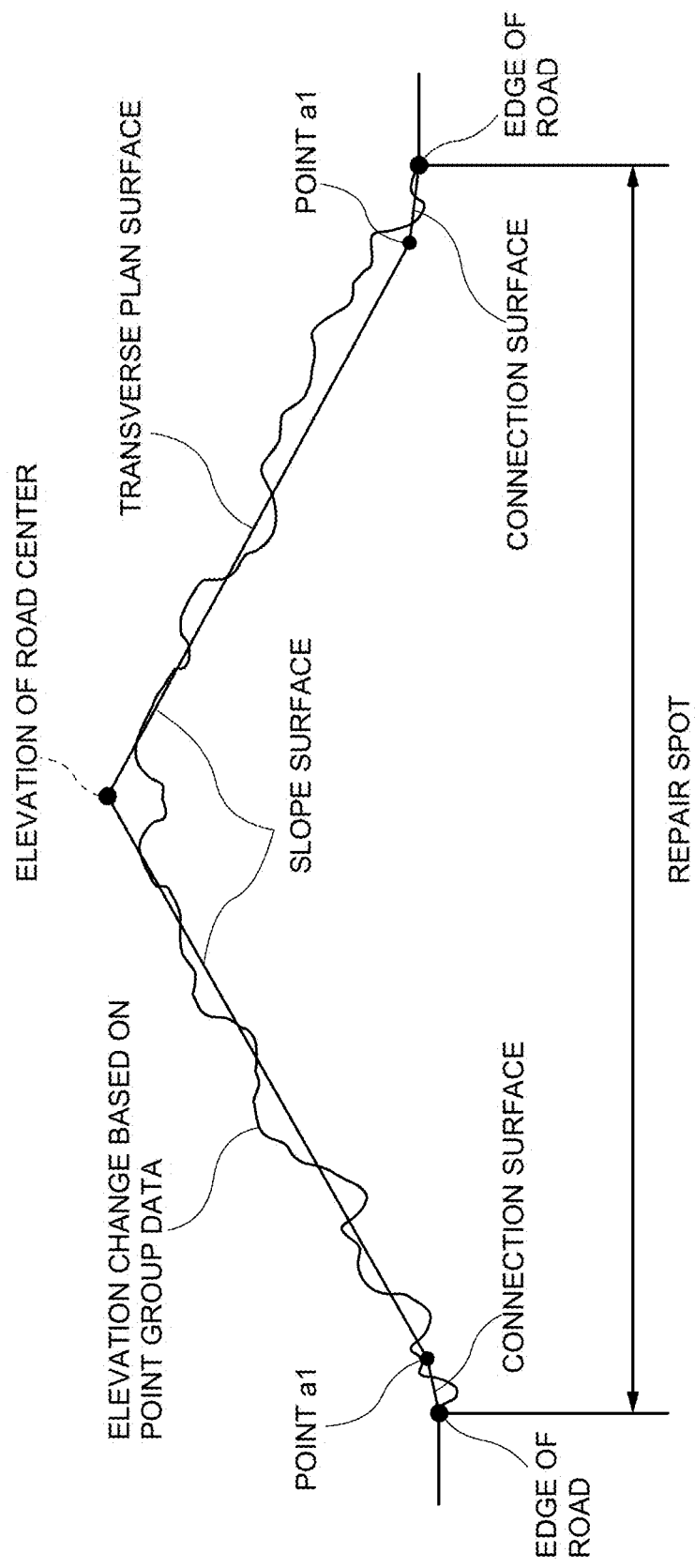
FIG. 26 is a schematic diagram illustrating a transverse plan surface.

In the longitudinal plan, the elevation at each point on the line along the center of the road is planned, and thereafter the transverse plan is conducted. The transverse plan is a plan for the elevation at each point on the line along the transverse direction of the road at each position on the line along the center of the road. For example, FIG. 26 illustrates the transverse plan surface for the elevation at each point along the line in the transverse direction of the road at a point a in FIG. 25. In FIG. 26, a repair spot where the repair plan is required is between an edge on the left and an edge on the right of the road. In the repair spot, the elevation change based on the point group data, as well as the transverse plan surface are illustrated. In FIG. 26, the slope of the road is illustrated so as to be easily distinguished.

The transverse plan surface is obtained by planning for each position on the line along the center of the road illustrated in FIG. 25 in consideration of, for example, the slope angle of a slope surface that slopes downward from the elevation at the center of the road toward both ends of the road. For example, in a case where the transverse plan of a road is conducted, the road is usually designed to slope downward at a predetermined slope angle from the center of the road to each edge of the road.

For example, in the transverse plan surface of FIG. 26, the elevation decreases from the elevation at the center of the road at the point a in the longitudinal plan surface of FIG. 25 to a point a1 along the slope surface that slopes downward at a predetermined slope angle toward both ends of the road, and thereafter the elevation decreases to the left edge of the road and the right edge of the road along a connection surface that connects the point a1 to the left edge of the road and the right edge of the road. Therefore, when repair is conducted on the basis of the transverse plan surface, a surface layer portion of asphalt pavement formed at the repair spot and concrete portions at the left edge of the road and the right edge of the road are connected without any steps. The transverse plan surface in FIG. 26 is an example of the transverse plan surface, and the method for transverse plan is not limited to the above. Therefore, the transverse plan surface may be designed, for example, to connect slope surfaces that slope downward at a plurality of different slope angles from the center of the road to the edges of the road.

By connecting the respective transverse plan surfaces at positions on the line along the center of the road obtained as described above in the longitudinal direction, the repair plan surface for repairing the road surface is acquired.

In Step S12 (point group data acquisition step), the 3D scanner 4 acquires point group data at each point in the road surface. The repair plan surface is converted into a three-dimensional TIN model (triangulated irregular network) which is a collection of triangular planes connected with the point group data acquired by the 3D scanner as vertices, and it is possible to derive data corresponding to the latitude, the longitude, and the height of each point on the road surface. Even when the point group data of each point in the survey region is not acquired by the 3D scanner 4, it is possible to derive data corresponding to the latitude, the longitude, and the height of each point.

In Step S13 (ground model creation step), a ground model is created on the basis of the orthoimage created in Step S4 and the point group data for each point in the survey region obtained in Step S12. The ground model has the appropriate x, y, and z coordinates for each point in the survey region.

Figure 27:
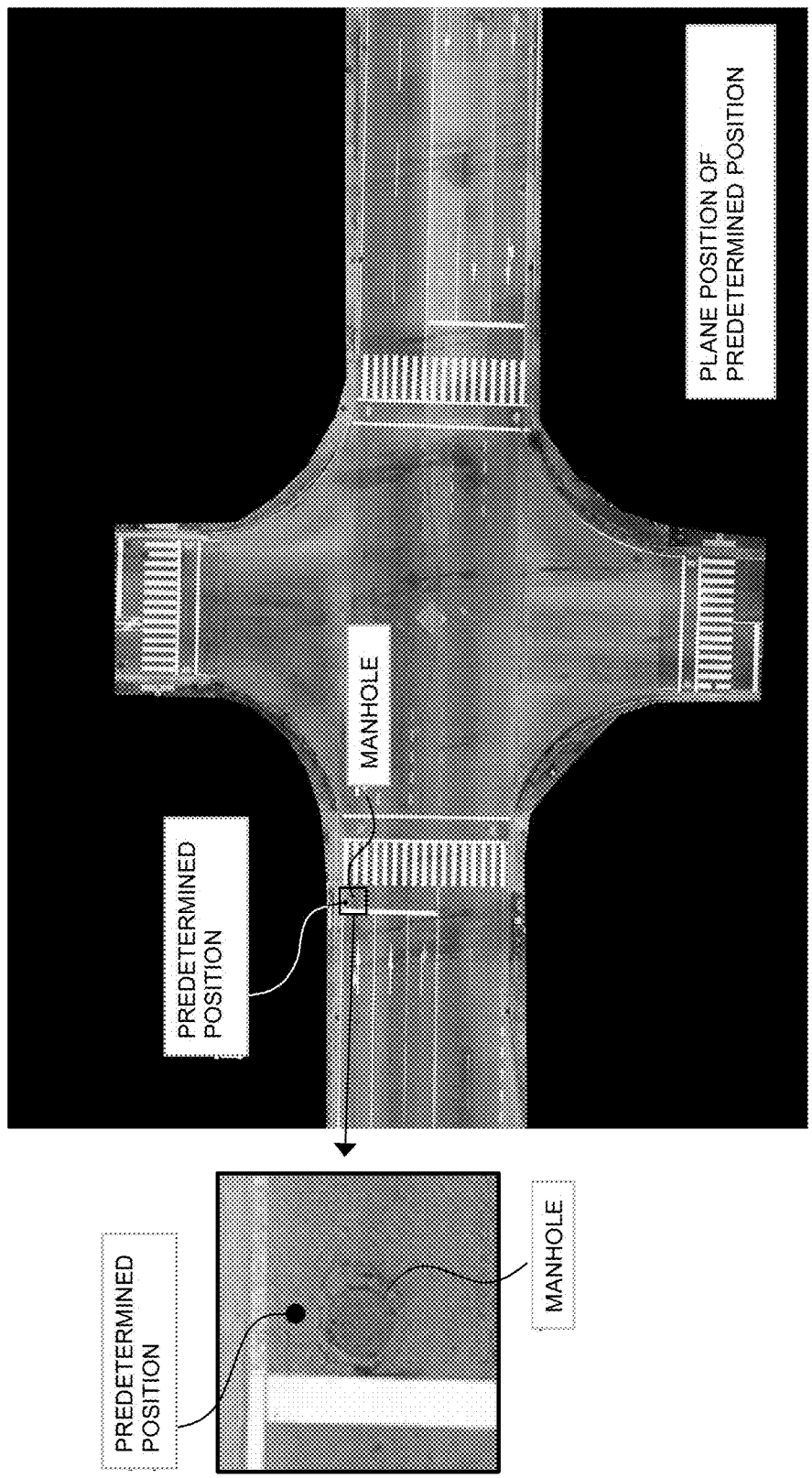
FIG. 27 is a diagram illustrating a state in which an elevation at a predetermined position of a manhole peripheral part is displayed.

In Step S14 (elevation difference derivation step), a predetermined position in the manhole peripheral part is pressed and designated on the basis of the ground model (orthoimage) displayed on the display surface 5a of the display unit 5, so that the plane position (the latitude and the longitude) of that predetermined position is displayed, as illustrated in FIG. 27. Therefore, the designated position in the manhole peripheral part in the orthoimage displayed on the display surface 5a of the display unit 5 is changed, so that two plane positions on the upstream and downstream sides in the longitudinal direction of the manhole, and two plane positions on the upstream and downstream sides in the transverse direction of the manhole are detected.

The elevation at each position in the manhole peripheral part at the time of start of repair is derived from the point group data acquired by the 3D scanner 4, since the plane position at each position in the manhole peripheral part at the time of start of repair detected. In this embodiment, the elevations for all plane positions in the orthoimage can be derived on the basis of the point group data acquired by the 3D scanner 4, by the orthoimage and the point group data acquired by the 3D scanner 4. The elevation at each position in the repair plan surface is retrieved from the plan surface data indicating the repair plan surface acquired in Step S9.

Figure 28:
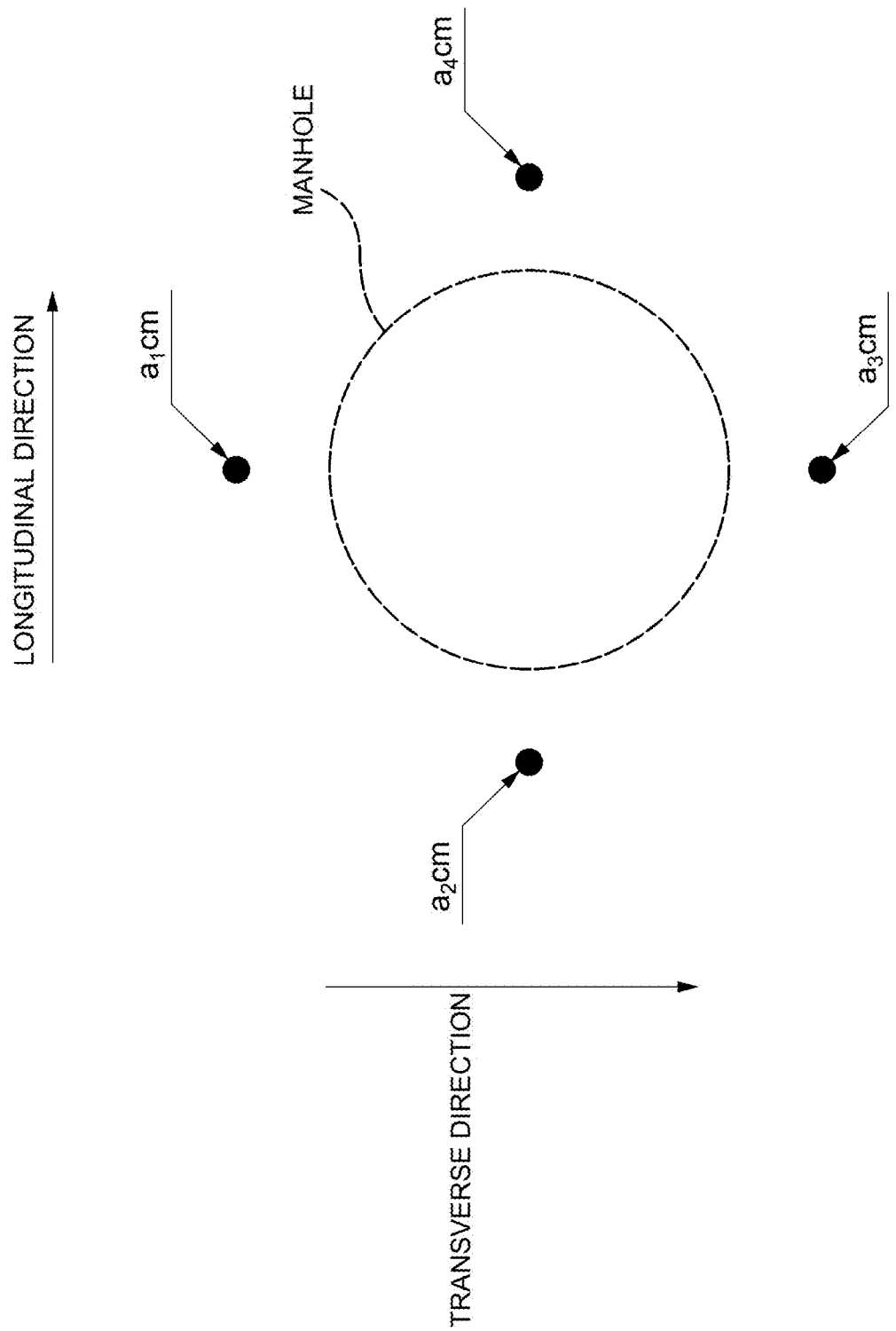
FIG. 28 is a diagram illustrating an adjustment height at each position in the manhole peripheral part.

Thereafter, the elevation difference between the elevation at each position in the manhole peripheral part at the time of start of repair and the elevation at each position in the repair plan surface is then derived as the adjustment height. Therefore, the adjustment heights of the two spots on the upstream and downstream sides in the longitudinal direction of the manhole and the adjustment heights of the two spots on the upstream and downstream sides in the transverse direction of the manhole are derived. In FIG. 28, the respective adjustment heights at the positions in the manhole peripheral part are $a_1$ cm, $a_2$ cm, $a_3$ cm, and $a_4$ cm. Therefore, $a_1$ cm is the adjustment height on the upstream side in the transverse direction of the manhole, $a_2$ cm is the adjustment height on the upstream side in the longitudinal direction of the manhole, $a_3$ cm is the adjustment height on the downstream side in the transverse direction of the manhole, and $a_4$ cm is the adjustment height on the downstream side in the longitudinal direction of the manhole.

(Road Survey Method 4)

The survey method for a distance between two designated points on a road surface will be described with reference to FIG. 29.

In the survey method for a distance between two designated points on a road surface, in a case where various distances in road repair are required, the distances are surveyed on the basis of the orthoimage displayed on the display unit 5. Examples of the distance required for road repair includes the length of a road repair portion, the width of a road, and the length of a predetermined region of a road surface.

In Step S101 (point group data acquisition step), the 3D scanner 4 acquires point group data at each point in the road surface around the repair spot where the road is to be repaired. The repair plan surface is converted into a three-dimensional TIN model (triangulated irregular network) which is a collection of triangular planes connected with the point group data acquired by the 3D scanner as vertices, and it is possible to derive data corresponding to the latitude, the longitude, and the height of each point on the road surface. Even when the point group data of each point in the survey region is not acquired by the 3D scanner 4, it is possible to derive data corresponding to the latitude, the longitude, and the height of each point.

In Step S102 (coordinate acquisition step), three-dimensional coordinates, that is, plane positions (latitudes and longitudes) and elevations (heights) for a plurality of predetermined positions, that is, predetermined positions where the plurality of survey markers 6 are installed are acquired on the basis of the point group data acquired in Step S101 in the periphery of a repair spot where the road is to be repaired. The three-dimensional coordinates of the plurality of predetermined positions may be acquired by the total station 2.

In Step S103 (photographing step), the road is photographed from the vicinity of the road by the camera 3. When the photographing is performed, a plurality of the survey markers 6 are previously installed at a plurality of predetermined positions where three-dimensional coordinates are acquired in Step S102. Therefore, for the plurality of survey markers 6, a plurality of photographed images are photographed such that each survey marker 6 is included in at least two of the photographed images.

In Step S104 (orthoimage creation step), an orthoimage is created on the basis of the three-dimensional coordinates acquired in Step S102 and the plurality of photographed images photographed in Step S103. At that time, the orthoimage created in Step S104 is associated with the point group data acquired by Step S101. That is, each point in the orthoimage is associated with the three-dimensional coordinates of the point group data, and each point on the orthoimage corresponds to a plane position (the latitude and the longitude) and an elevation (height).

Figure 30:
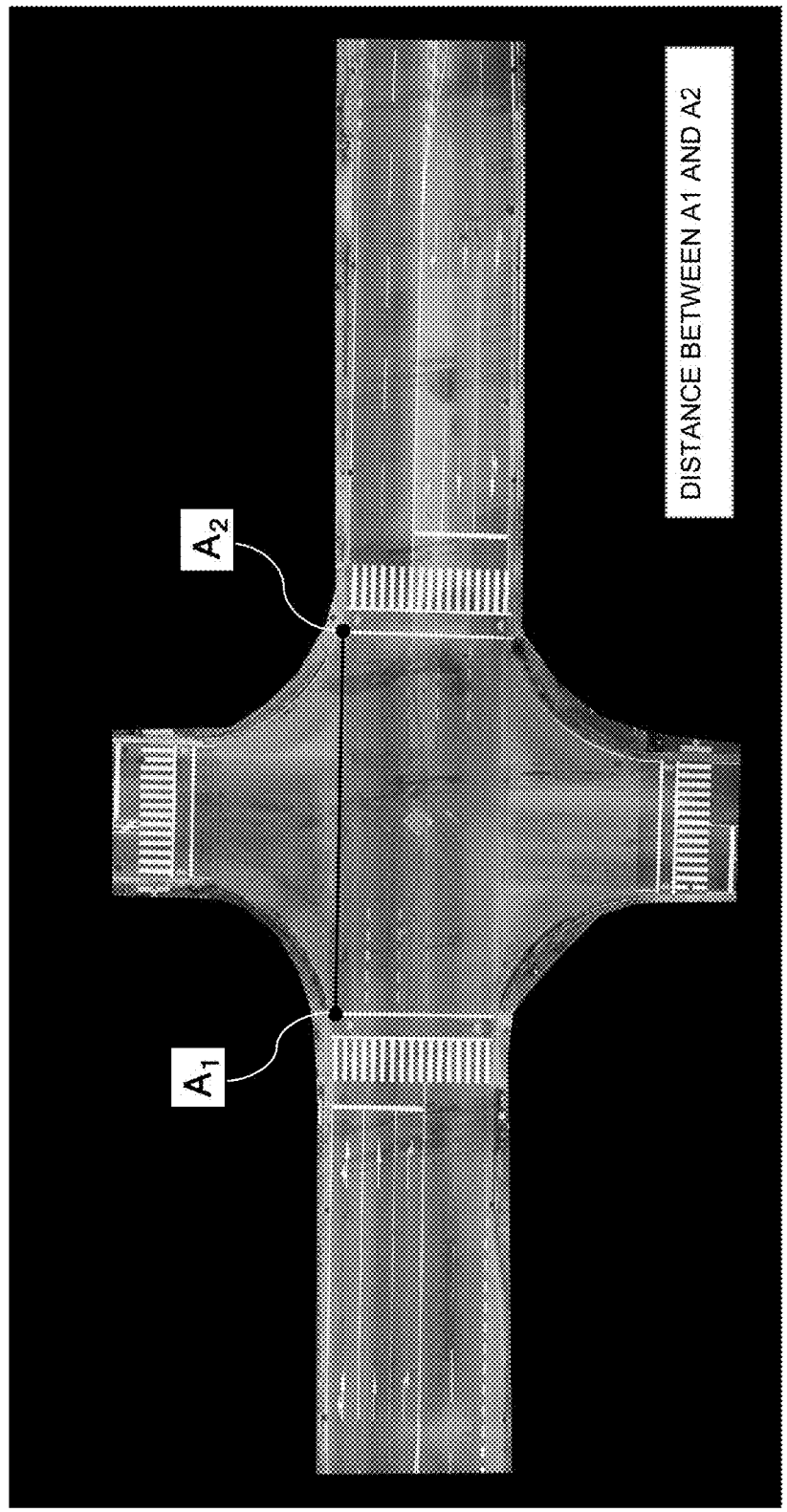
FIG. 30 is a diagram illustrating a state in which the distance between the designated points of the road surface is displayed.

As illustrated in FIG. 6, in Step S105 (display step), the orthoimage is displayed on the display unit 5. In Step S106 (distance display step), the two designated points of the road surface on the orthoimage displayed on the display surface 5a of the display unit 5 is pressed and designated, so that the distance between the designated points is displayed. For example, as illustrated in FIG. 30, when two designated points A1 and A2 at an intersection are designated, the distance between designated points A1 and A2 is displayed. Therefore, in Step S103 (photographing step), when the road is photographed from the vicinity of the road by the camera 3, even if the various distances required for road repair are not measured, the position of the two designated points on the road surface in the orthoimage displayed on the display surface 5a of the display unit 5 is changed, so that the distances between the various designated points within the range of the orthoimage is detected.

(Road Survey Method 5)

The survey method for the area of a designated range of a road surface will be described with reference to FIG. 31.

In the survey method for the area of a designated range of a road surface, in a case where the areas of various regions are required in road repair, the areas of the regions are surveyed on the basis of the orthoimage displayed on the display unit 5. Example of the area of the region required for road repair includes the area of a road repair portion.

In Step S101 (point group data acquisition step), the 3D scanner 4 acquires point group data at each point in the road surface around the repair spot where the road is to be repaired. The repair plan surface is converted into a three-dimensional TIN model (triangulated irregular network) which is a collection of triangular planes connected with the point group data acquired by the 3D scanner as vertices, and it is possible to derive data corresponding to the latitude, the longitude, and the height of each point on the road surface. Even when the point group data of each point in the survey region is not acquired by the 3D scanner 4, it is possible to derive data corresponding to the latitude, the longitude, and the height of each point.

In Step S102 (coordinate acquisition step), three-dimensional coordinates, that is, plane positions (latitudes and longitudes) and elevations (heights) for a plurality of predetermined positions, that is, predetermined positions where the plurality of survey markers 6 are installed are acquired on the basis of the point group data acquired in Step S101 in the periphery of a repair spot where the road is to be repaired. The three-dimensional coordinates of the plurality of predetermined positions may be acquired by the total station 2.

In Step S103 (photographing step), the road is photographed from the vicinity of the road by the camera 3. When the photographing is performed, a plurality of the survey markers 6 are previously installed at a plurality of predetermined positions where three-dimensional coordinates are acquired in Step S102. Therefore, for the plurality of survey markers 6, a plurality of photographed images are photographed such that each survey marker 6 is included in at least two of the photographed images.

In Step S104 (orthoimage creation step), an orthoimage is created on the basis of the three-dimensional coordinates acquired in Step S102 and the plurality of photographed images photographed in Step S103. At that time, the orthoimage created in Step S104 is associated with the point group data acquired by Step S101. That is, each point in the orthoimage is associated with the three-dimensional coordinates of the point group data, and each point on the orthoimage corresponds to a plane position (the latitude and the longitude) and an elevation (height).

Figure 32:
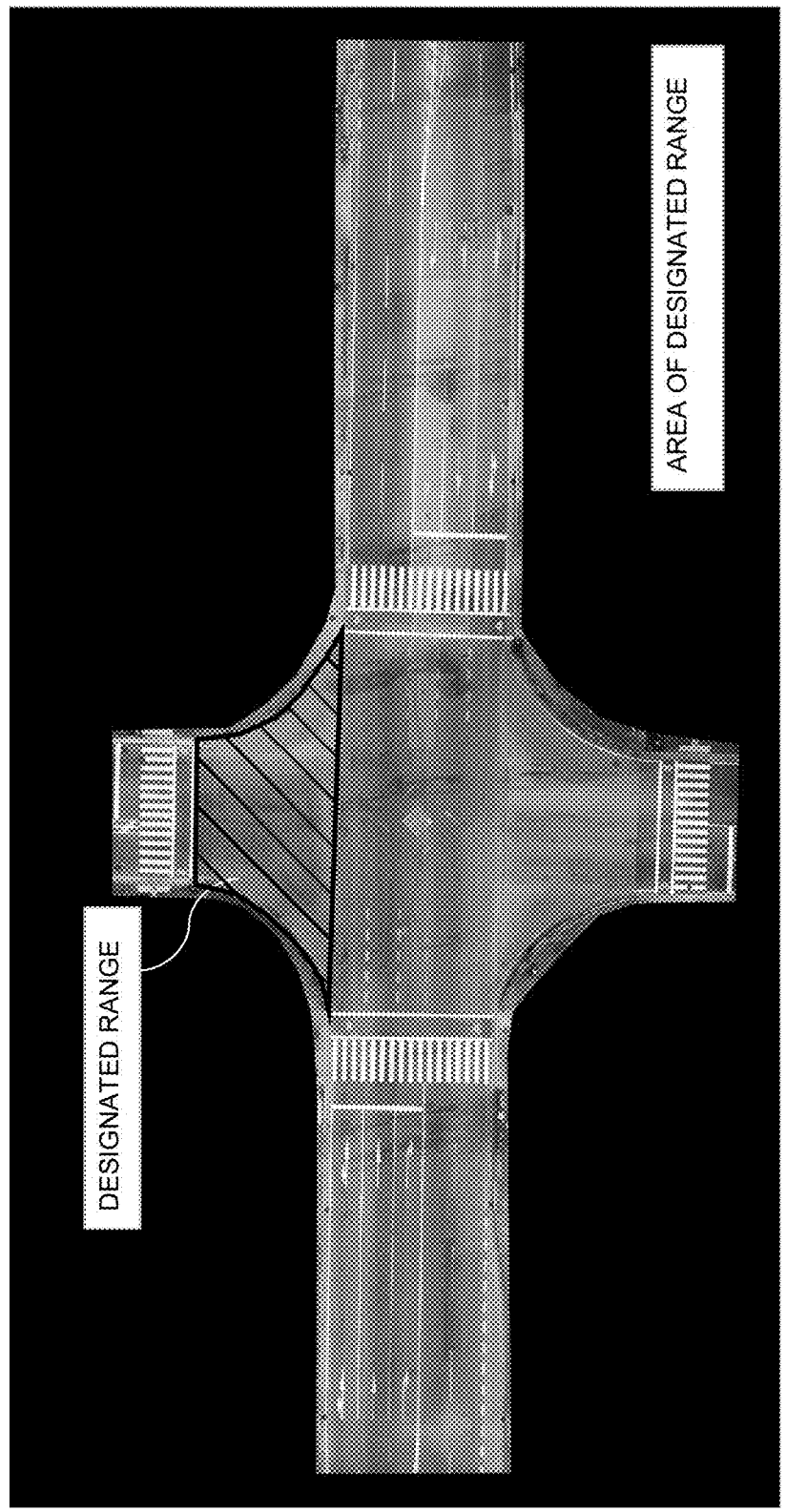
FIG. 32 is a diagram illustrating a state in which the area of the designated range of the road surface is displayed.

As illustrated in FIG. 6, in Step S105 (display step), the orthoimage is displayed on the display unit 5. In Step S108 (area display step), the designated range of the road surface is designated in the orthoimage displayed on the display surface 5a of the display unit 5, so that the area of the designated range is displayed as illustrated in FIG. 32. For example, as illustrated in FIG. 32, when a designated range (shaded portion) indicating the upper portion of an intersection is designated, the area of the designated range is displayed. Therefore, in Step S103 (photographing step), when the road is photographed from the vicinity of the road by the camera 3, even if the various areas required for road repair are not measured, the position of the designated range of the road surface in the orthoimage displayed on the display surface 5a of the display unit 5 is changed, so that the areas of the various regions within the range of the orthoimage is detected.

The orthoimage creation method of this embodiment includes: the coordinate acquisition step of acquiring the three-dimensional coordinates for the plurality of feature points; the photographing step of photographing, by the camera 3 (photographing device), the plurality of photographed images such that each of the plurality of feature points is included in at least two of the photographed images; and the orthoimage creation step of creating the orthoimage with a ground pixel size of 5 mm or less on the basis of the three-dimensional coordinates of each of the feature points acquired in the coordinate acquisition step, and the plurality of photographed images photographed in the photographing step.

The orthoimage creation system 1 of this embodiment includes: the coordinate storage unit 11 (coordinate storage means) for storing the three-dimensional coordinates for the plurality of feature points; the photographed image storage unit 12 (photographed image storage means) for storing, by the camera 3 (photographing device), the plurality of photographed images photographed so as to include each of the plurality of feature points in at least two of the photographed images; and the orthoimage creation unit 14 (orthoimage creation means) for creating the orthoimage with a ground pixel size of 5 mm or less on the basis of the three-dimensional coordinates of each of the feature points stored in the coordinate storage unit 11, and the plurality of photographed images stored in the photographed image storage unit 12.

Consequently, in the orthoimage creation method and the orthoimage creation system 1 of this embodiment, the orthoimage with a ground pixel size of 5 mm or less is created, so that it is possible to create the orthoimage in which the condition of the road surface and the location of the plane elements around the road can be clearly distinguished. In the orthoimage created by the present invention, it is possible to clearly distinguish spots where cracks and patching have occurred in a road. Therefore, it is not necessary to drive a special road surface condition survey vehicle to survey the cracking condition of a road surface, and therefore it is possible to survey the road condition regardless of the road width.

In the orthoimage created in this embodiment, it is possible to clearly distinguish the locations of plane element including the edges of the road and compartment lines such as lane marking lines. Therefore, there is no need to measure on a large number of plane positions in order to illustrate the plane elements including the edges of the road and compartment lines such as lane marking lines, and therefore it is possible to easily illustrate the plane elements on the basis of the orthoimage.

In the orthoimage created in this embodiment, it is possible to detect each plane position in the longitudinal direction and the transverse direction of a manhole peripheral part. Therefore, after identifying each plane position in the longitudinal and transverse directions of the manhole peripheral part, the elevation of each plane position can be retrieved from the point group data acquired by a three-dimensional scanning device. Therefore, it is not necessary to create a road longitudinal cross section and a road transverse cross section for each manhole in order to detect the elevation of each plane position in the longitudinal and transverse directions of the manhole peripheral part. Accordingly, it is possible to easily detect the manhole adjustment height.

In the orthoimage creation method of this embodiment, the camera 3 (photographing device) is a photographing device located at an altitude of 20 meters or less above the ground.

In the orthoimage creation system 1 of this embodiment, the camera 3 (photographing device) is a photographing device located at an altitude of 20 meters or less above the ground.

Consequently, in the orthoimage creation method and the orthoimage creation system 1 of this embodiment, it is possible to easily create an orthoimage with a ground pixel size of 5 mm or less.

In the orthoimage creation method of this embodiment, the feature points are the survey markers 6 installed on the ground at a time of photographing in the photographing step, and in the coordinate acquisition step, the three-dimensional coordinates of the survey markers 6 are acquired by the total station 2.

In the orthoimage creation system 1 of this embodiment, the feature points are the survey markers 6 installed on the ground at a time of photographing by the camera 3 (photographing device), and the coordinate storage unit 11 (coordinate storage means) stores the three-dimensional coordinates of the survey markers 6 acquired by the total station 2.

Consequently, in the orthoimage creation method and the orthoimage creation system 1 of this embodiment, it is possible to easily create an orthoimage in which the condition of the road surface and the position of plane elements around the road can be clearly distinguished.

The ground model creation method of this embodiment includes: the point group data acquisition step of acquiring the point group data generated as the three-dimensional coordinates for each point in the predetermined region included in the orthoimage created by any of the orthoimage creation methods described above by a laser beam emitted from the 3D scanner 3 (three-dimensional scanning device) installed in the known point; and the ground model creation step of creating the ground model in the predetermined region on the basis of the orthoimage created by the orthoimage creation method and the point group data acquired in the point group data acquisition step.

The ground model creation system of this embodiment includes: the point group data storage unit 13 (point group data storage means) for storing the point group data generated as the three-dimensional coordinates for each point in the predetermined region included in the orthoimage created by the orthoimage creation systems described above by a laser beam emitted from the 3D scanner 3 (three-dimensional scanning device) in the known point; and the ground model creation unit 15 (ground model creation means) for creating the ground model in the predetermined region on the basis of the orthoimage and the point group data stored in the point group data storage unit 13.

Consequently, in the ground model creation method and the ground model creation system of this embodiment, it is possible to clearly detect the three-dimensional shape of the predetermined region included in the orthoimage. Therefore, for example, it is possible to clearly detect height information such as the height of road surface irregularities, steps around a road, and the manhole height.

Although the embodiment of the present invention is described above, the specific configuration of each unit is not limited to the above embodiment, and various modifications are possible without departing from the spirits of the present invention.

In the above embodiment, a case where an inspector in the vicinity of the road operates the camera 3 to photograph the road surface is described. However, a UAV 103 (Unmanned Aerial Vehicle) that is an unmanned aerial vehicle which flying over the road has a photographing device, and may photograph the road surface from the sky, acquire photographic data, and supply the photographic data to the orthoimage creation device 10.

Figure 33:
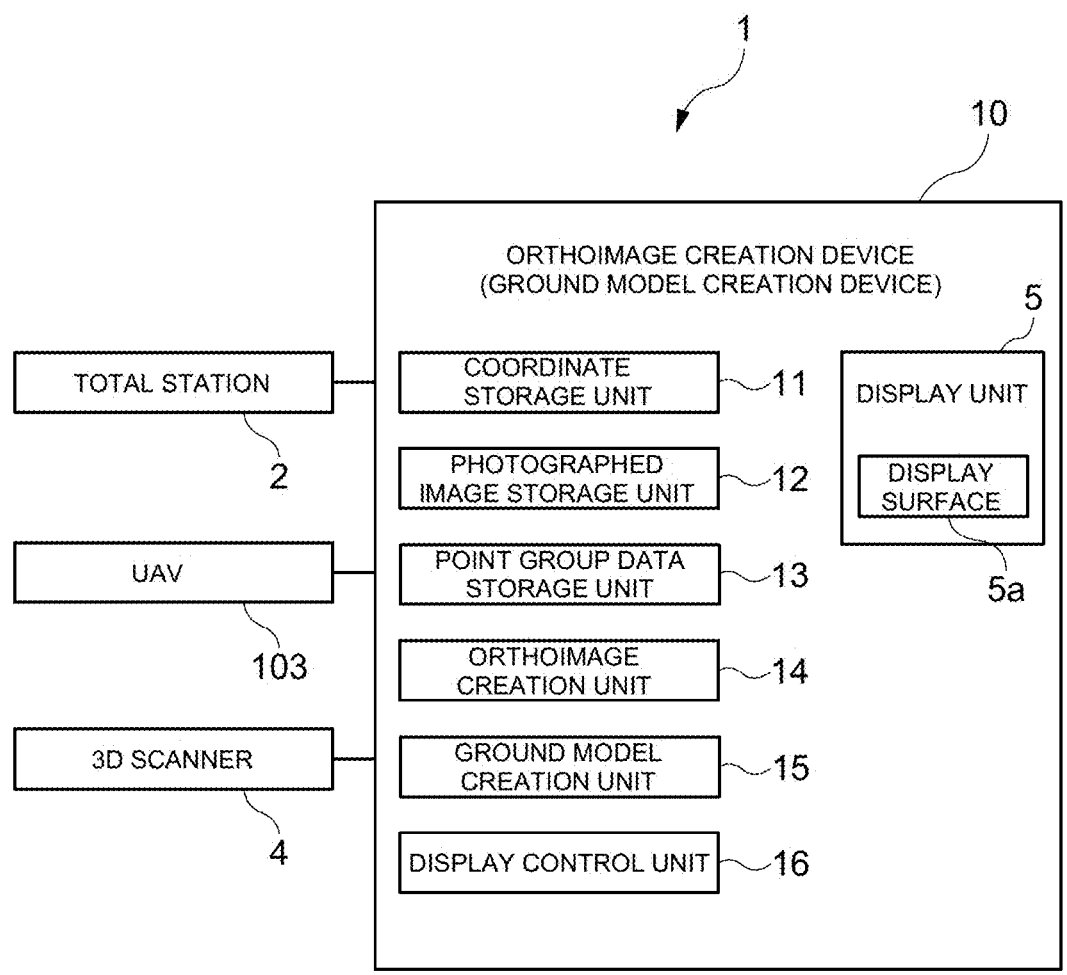
FIG. 33 is a diagram illustrating a schematic configuration of an orthoimage creation system according to a modification of the present invention.

In this case, as illustrated in FIG. 33, an orthoimage creation system 1 (ground model creation system) according to this modification may have, for example, a total station 2 installed at a known point (e.g., a reference point), the UAV 103 (Unmanned Aerial Vehicle) that is an unmanned aerial vehicle as a photographing device, a 3D scanner 4 (three-dimensional scanning device) installed at a known point, and an orthoimage creation device 10 (ground model creation device) wirelessly connected to the total station 2, the UAV 103 and the 3D scanner 4.

The UAV 103 flies over a road at an almost constant altitude and photographs the road from the sky. The UAV 103 flies at an altitude of 20 meters or less above the ground at the time of photographing, for example, flies at an altitude of 5 to 20 meters, preferably 5 to 15 meters.

When a road is photographed from the sky by the UAV 103, a plurality of survey markers 6 are installed as a plurality of feature points, for example, in the vicinity of both edges of the road. The plurality of survey markers 6 are installed along the edge of the road (in the longitudinal direction of the road), for example, at intervals of 5 to 15 meters. The plurality of survey markers 6 are installed with the consideration that a plurality of photographed images photographed from the sky are connected to create an orthoimage.

Figure 34:
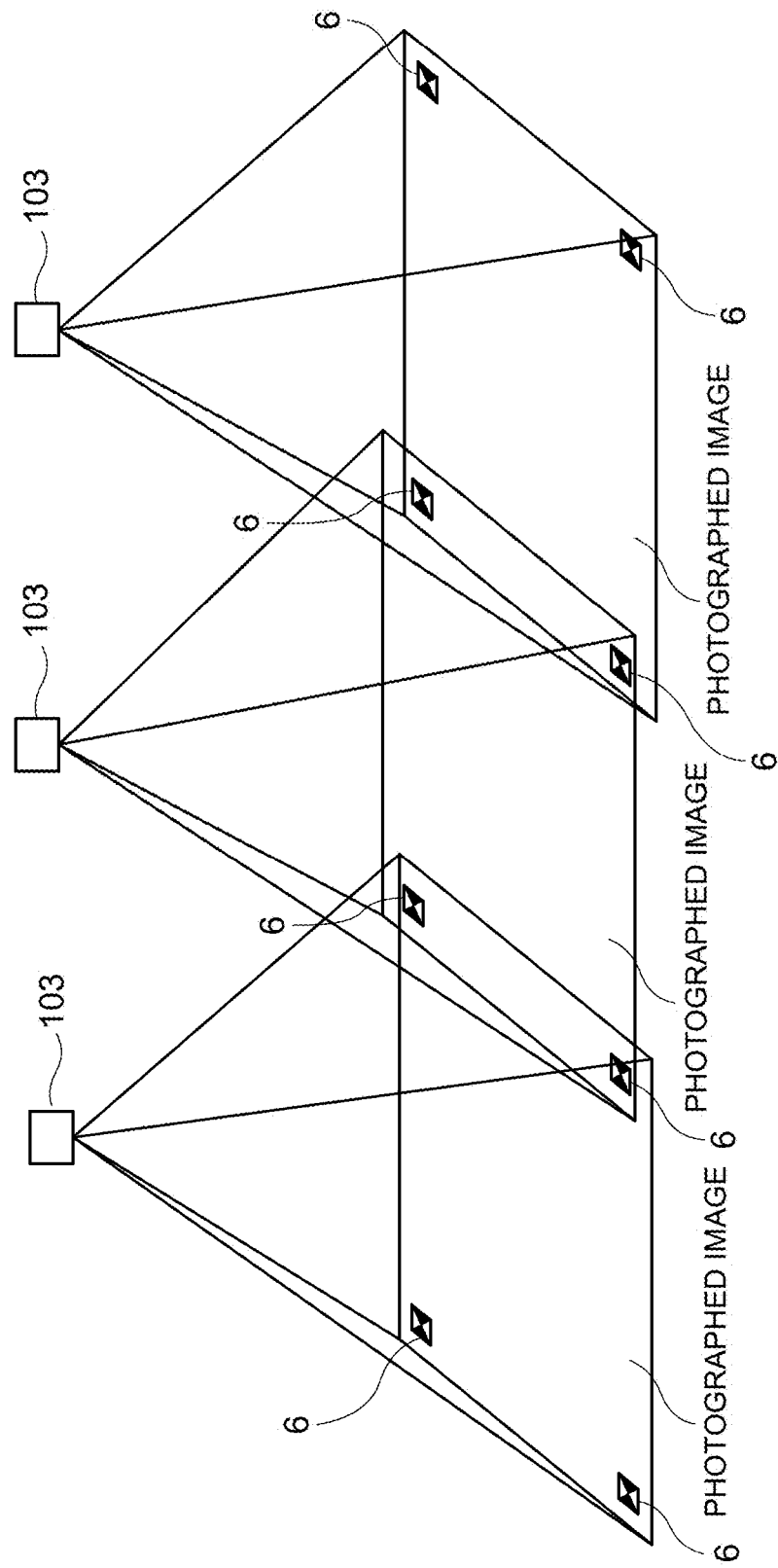
FIG. 34 is a diagram illustrating a state in which survey markers are included in each two of photographed images.

As illustrated in FIG. 34, the UAV 103 photographs such that each survey marker 6 is included in at least two of the plurality of images photographed by UAV 103. Therefore, at least the one common survey marker 6 is photographed in the adjacent two of the photographed images. FIG. 34 illustrates a case where the survey markers 6 are included in all photographed images, but the plurality of images photographed by the UAV 103 may be photographed such that any of the survey marker 6 and the feature points other than the survey marker 6 is included in at least the two of the photographed images.

In addition, the orthoimage creation system (ground model creation system) according to the present invention has a camera and a UAV as the photographing device, and may create an orthoimage or a ground model by combining photographed images of the road surface by an inspector who is around the road and operates the camera, and photographed images of the road surface from the sky by the UAV flying over the road.

The orthoimage is created on the basis of the photographed image of the road photographed by the camera 3 from a nearly constant height in the above embodiment, and the orthoimage is created on the basis of the photographed image photographed over the road by the UAV 103 flying at a nearly constant altitude in the above modification. However, the present invention includes creation of an orthoimage based on photographed images of a road photographed at different heights by the camera 3, and an orthoimage based on photographed images photographed over the road by the UAV 103 flying at different altitudes of 20 meters or less above the ground. In the above embodiment, the three-dimensional coordinates of the survey marker 6 installed around the road are acquired by the total station 2. However, the three-dimensional coordinates of the survey marker 6 installed around the road may be acquired, for example, by GNSS (Global Navigation Satellite System), which is a positioning system using satellites, such as a GPS. The three-dimensional coordinates of each survey marker 6 installed around the road may be acquired by scanning of the 3D scanner 4. The survey marker 6 of the above embodiment has a pattern that clarifies the center position used as a rating point, but the survey marker 6 may have a pattern that identifies a position other than the center position of the survey marker 6, and that position other than the center position may be used as the rating point. The plurality of survey markers 6 are installed at intervals of, for example, 1 to 3 meters along the edge of the road (longitudinal direction of the road) in the above embodiment, and in the above variant, the plurality of survey markers 6 are installed at intervals of, for example, 5 to 15 meters in the above modification. However, the arrangement of the plurality of survey markers 6 is arbitrary. Therefore, a plurality of survey markers 6 may be installed at intervals of, for example, one meter or less along the width direction of the road. In Step S1 (coordinate acquisition step), the three-dimensional coordinates of the predetermined position where the plurality of survey markers 6 are installed are acquired by the total station 2. However, in a case where the three-dimensional coordinates of the predetermined position are already acquired, the three-dimensional coordinates may be acquired. In the above embodiment, the plate-like survey markers 6 are installed on the road surface. However, instead of the use of the plate-like survey markers 6, the pattern similar to that of the survey markers 6 may be formed on the road surface by paint or any other material. For example, a pattern of the same shape as white portions in the survey marker 6 of FIG. 3 may be sprayed on an asphalt surface of a road with paint of a different color from the asphalt surface, and the pattern similar to the survey marker 6 may be formed. When the survey marker is formed on the road surface by any material such as paint, the type, the shape, the size, and the pattern of the survey marker are also arbitrary.

The road is photographed by the unmanned aircraft (including the photographing device) flying at an altitude of 20 meters or less above the ground in the above modification, but may be photographed by a model aerial vehicle (including the photographing device) flying at an altitude of 20 meters or less above the ground. In the present invention, the unmanned aerial vehicle is an airplane, a rotorcraft, an airship, or the like which cannot be boarded by a person, and which can be flown by remote control or automatic control, such as a drone (multicopter), a radio-controlled plane, or the like. The model aerial vehicle is, for example, a multicopter, radio-controlled plane, or the like, and weighs less than 200 grams, which is the sum of the weight of an aerial vehicle body and the weight of a battery.

The survey markers 6 installed on the ground at the time of photographing are used as feature points for connecting the plurality of photographed images, and the three-dimensional coordinates of each of the survey markers 6 are acquired by the total station 2. In a case where a predetermined point in the image photographed by the camera 3 (UAV 103) is used as each feature point for connecting the plurality of photographed images, and the point group data generated as three-dimensional coordinates for each point in the photographed image including the predetermined point has already been acquired by scanning with the 3D scanner 4, the three-dimensional coordinates of the predetermined point may be acquired from the point group data.

The examples of the creation method for an orthoimage and the creation method for a ground model are described in the above embodiment, but the order of each step may be changed as needed. In FIG. 5, FIG. 14, FIG. 18 and FIG. 23, the order of Step S1, Step S2 and Step S3 may be changed. For example, it is possible to photograph the photographed images after acquiring the three-dimensional coordinates of the survey markers 6; or it is possible to acquire the three-dimensional coordinates of the survey markers 6 after photographing the photographed images; or photographing of the photographed images and acquisition of the three-dimensional coordinates of the survey markers 6 may be performed at the same time. In FIG. 5, FIG. 14, FIG. 18 and FIG. 23, the order of Step S3 and Step S4 may be opposite. For example, the orthoimage can be created after the point group data is acquired, the point group data can be acquired after the orthoimage is created, and the creation of the orthoimage and the acquisition of the point group data may be performed at the same time.

Figure 29:
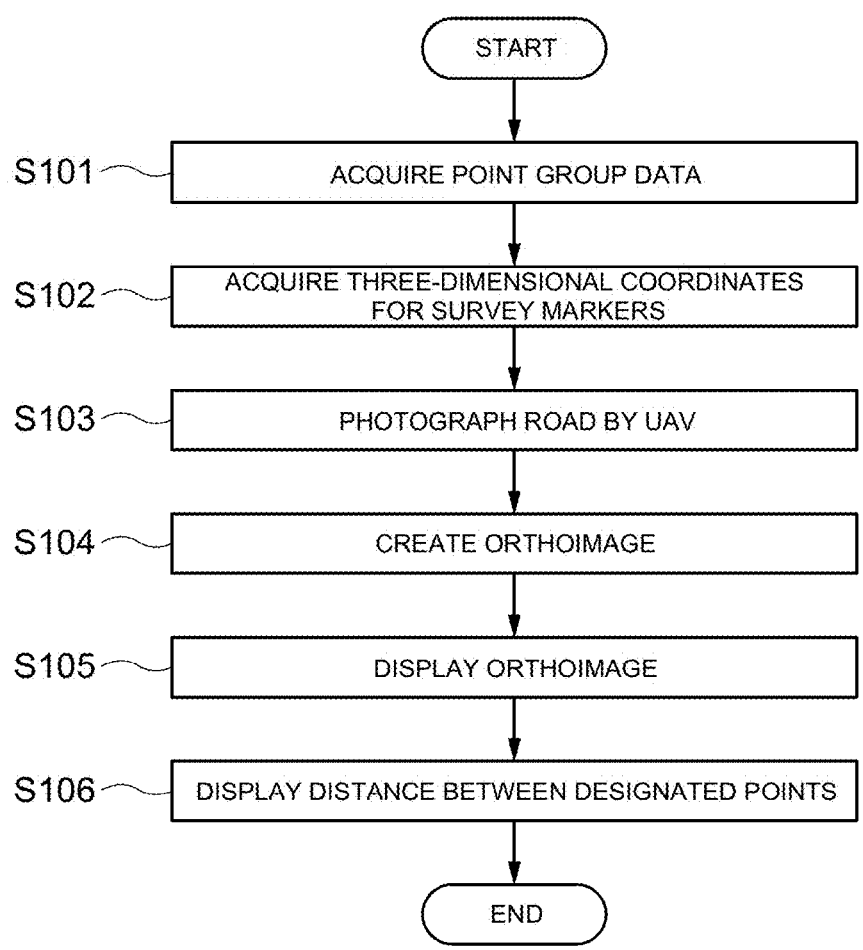
FIG. 29 is a diagram illustrating a survey method for a distance between designated points of a road surface.
Figure 31:
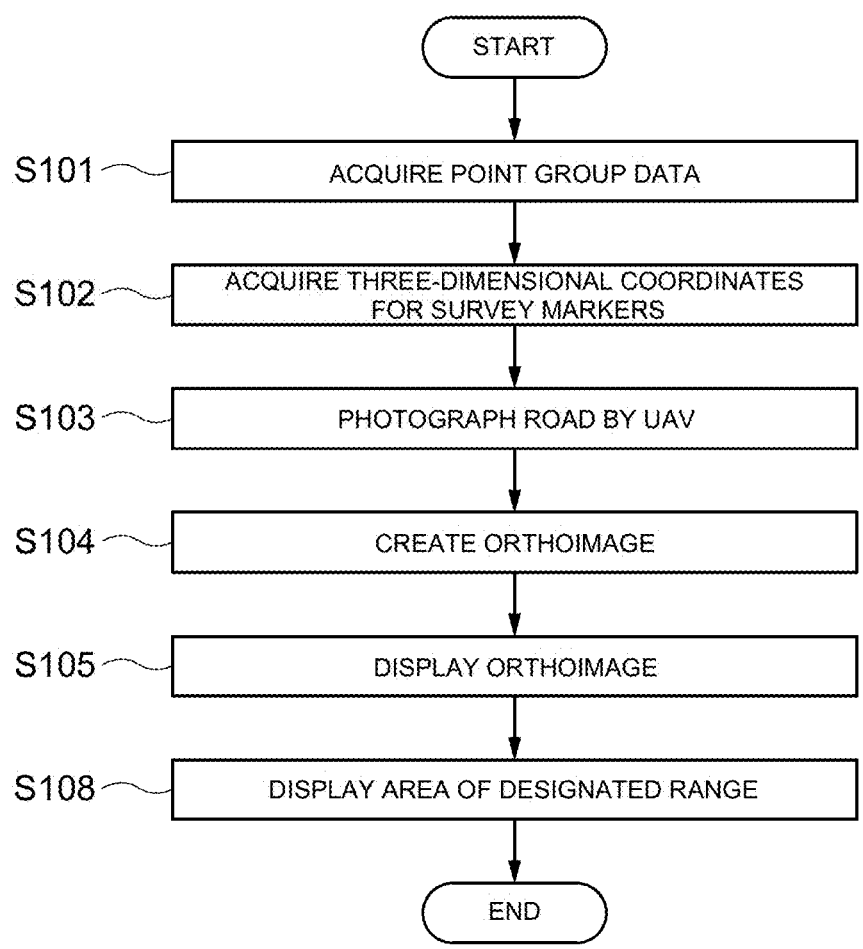
FIG. 31 is a diagram illustrating a survey method for an area of a designated range of the road surface.

The examples of the creation method for an orthoimage and the creation method for a ground model are described in the above embodiment, but the order of Step S102 and Step S103 may be opposite in FIG. 29 and FIG. 31. Therefore, it is possible to photograph the photographed images after acquiring the three-dimensional coordinates of the survey markers 6, and the three-dimensional coordinates of the survey markers 6 can be acquired after the photographed images are photographed, and the three-dimensional coordinates of the survey markers 6 can be acquired, and photographing of the photographed images and acquisition of the three-dimensional coordinates of the survey markers 6 may be performed at the same time. In FIG. 29 and FIG. 31, the order of Step S101 and Step S103 may be opposite. Therefore, although the point group data of the region including the plurality of survey markers 6 is photographed after the point group data of the region including the plurality of survey markers 6 is acquired, the point group data of the region including the plurality of survey markers 6 may be acquired after the point group data of the region including the plurality of survey markers 6 is photographed.

In the above embodiment, as the surveys performed using the orthoimages created by the orthoimage creation device 10, the survey of the cracking condition of the road surface, the survey of the position of plan elements around the road, the survey for repairing a manhole peripheral part; the survey for a distance between the two designated points of the road surface; the survey for the area of the designated range of the road surface are described above. However, an orthoimage created by the orthoimage creation device 10 may be used for a survey other than the above surveys.

INDUSTRIAL APPLICABILITY

The present invention can be used, for example, as an orthoimage creation method and an orthoimage creation system for creating an orthoimages on the basis of a photographed images photographed from the sky by an unmanned aerial vehicle, and as a ground model creation method and ground model creation system for creating ground models using those orthoimages.

REFERENCE SIGNS LIST

1 . . . orthoimage creation system (ground model creation system)
2 . . . total station
3 . . . camera (photographing device)
4 . . . 3D scanner (three-dimensional scanning device)
5 . . . display unit
6 . . . survey marker
10 . . . orthoimage creation device (ground model creation device)
11 . . . coordinate storage unit (coordinate storage means)
12 . . . photographed image storage unit (photographed image storage means)
13 . . . point group data storage unit (point group data storage means)
14 . . . orthoimage creation unit (orthoimage creation means)
15 . . . ground model creation unit (ground model creation means)
16 . . . display control unit
103 . . . UAV (unmanned aerial vehicle)

The invention claimed is:
1. An orthoimage creation method comprising:
a coordinate acquisition step of acquiring three-dimensional coordinates for a plurality of feature points;
a photographing step of photographing, by a photographing device, a plurality of photographed images such that each of the plurality of feature points is included in at least two of the photographed images; and an orthoimage creation step of creating an orthoimage with a ground pixel size of 5 mm or less on the basis of the three-dimensional coordinates of each of the feature points acquired in the coordinate acquisition step, and the plurality of photographed images photographed in the photographing step.

2. The orthoimage creation method according to claim 1, wherein
the photographing device is a photographing device located at an altitude of 20 meters or less above a ground.

3. The orthoimage creation method according to claim 2, wherein
the feature points are survey markers installed on the ground at a time of photographing in the photographing step, and
in the coordinate acquisition step, three-dimensional coordinates of the survey markers are acquired by any of a total station, a positioning system using a satellite, and a three-dimensional scanning device.

4. A ground model creation method comprising:
a point group data acquisition step of acquiring point group data generated as three-dimensional coordinates for each point in a predetermined region included in the orthoimage created by the orthoimage creation method according to claim 2 by a laser beam emitted from a three-dimensional scanning device installed in a known point; and
a ground model creation step of creating a ground model in the predetermined region on the basis of the orthoimage and the point group data acquired in the point group data acquisition step.

5. The orthoimage creation method according to claim 1, wherein
the photographing device is an unmanned aerial vehicle or a model aerial vehicle that flies at an altitude of 20 meters or less above the ground.

6. The orthoimage creation method according to claim 5, wherein
the feature points are survey markers installed on the ground at a time of photographing in the photographing step, and
in the coordinate acquisition step, three-dimensional coordinates of the survey markers are acquired by any of a total station, a positioning system using a satellite, and a three-dimensional scanning device.

7. A ground model creation method comprising:
a point group data acquisition step of acquiring point group data generated as three-dimensional coordinates for each point in a predetermined region included in the orthoimage created by the orthoimage creation method according to claim 5 by a laser beam emitted from a three-dimensional scanning device installed in a known point; and
a ground model creation step of creating a ground model in the predetermined region on the basis of the orthoimage and the point group data acquired in the point group data acquisition step.

8. The orthoimage creation method according to claim 1, wherein
the feature points are survey markers installed on the ground at a time of photographing in the photographing step, and
in the coordinate acquisition step, three-dimensional coordinates of the survey markers are acquired by any of a total station, a positioning system using a satellite, and a three-dimensional scanning device.

9. A ground model creation method comprising:
a point group data acquisition step of acquiring point group data generated as three-dimensional coordinates for each point in a predetermined region included in the orthoimage created by the orthoimage creation method according to claim 1 by a laser beam emitted from a three-dimensional scanning device installed in a known point; and
a ground model creation step of creating a ground model in the predetermined region on the basis of the orthoimage and the point group data acquired in the point group data acquisition step.

10. An orthoimage creation system comprising:
a coordinate storage means that stores three-dimensional coordinates for a plurality of feature points;
a photographed image storage means that stores, by a photographing device, a plurality of photographed images photographed such that each of the plurality of feature points is included in at least two of the photographed images; and
an orthoimage creation means that creates an orthoimage with a ground pixel size of 5 mm or less on the basis of the three-dimensional coordinates of each of the feature points stored in the coordinate storage means, and the plurality of photographed images stored in the photographed image storage means.

11. The orthoimage creation system according to claim 10, wherein
the photographing device is a photographing device located at an altitude of 20 meters or less above a ground.

12. The orthoimage creation system according to claim 11, wherein
the feature points are survey markers installed on the ground at a time of photographing by the photographing device, and
the coordinate storage means stores three-dimensional coordinates of the survey markers acquired by any of a total station, a positioning system using a satellite, and a three-dimensional scanning device.

13. A ground model creation system comprising:
a point group data storage means that stores point group data generated as three-dimensional coordinates for each point in a predetermined region included in the orthoimage created by the orthoimage creation system according to claim 11 by a laser beam emitted from a three-dimensional scanning device installed in a known point; and
a ground model creation means that creates a ground model in the predetermined region on the basis of the orthoimage and the point group data stored in the point group data storage means.

14. The orthoimage creation system according to claim 10, wherein
the photographing device is an unmanned aerial vehicle or a model aerial vehicle that flies at an altitude of 20 meters or less above the ground.

15. The orthoimage creation system according to claim 14, wherein
the feature points are survey markers installed on the ground at a time of photographing by the photographing device, and
the coordinate storage means stores three-dimensional coordinates of the survey markers acquired by any of a total station, a positioning system using a satellite, and a three-dimensional scanning device.

16. A ground model creation system comprising:
a point group data storage means that stores point group data generated as three-dimensional coordinates for each point in a predetermined region included in the orthoimage created by the orthoimage creation system according to claim 14 by a laser beam emitted from a three-dimensional scanning device installed in a known point; and
a ground model creation means that creates a ground model in the predetermined region on the basis of the orthoimage and the point group data stored in the point group data storage means.

17. The orthoimage creation system according to claim 10, wherein
the feature points are survey markers installed on the ground at a time of photographing by the photographing device, and
the coordinate storage means stores three-dimensional coordinates of the survey markers acquired by any of a total station, a positioning system using a satellite, and a three-dimensional scanning device.

18. A ground model creation system comprising:
a point group data storage means that stores point group data generated as three-dimensional coordinates for each point in a predetermined region included in the orthoimage created by the orthoimage creation system according to claim 10 by a laser beam emitted from a three-dimensional scanning device installed in a known point; and
a ground model creation means that creates a ground model in the predetermined region on the basis of the orthoimage and the point group data stored in the point group data storage means.

* * * * *